US010743199B1

(12) United States Patent
Patil et al.

(10) Patent No.: US 10,743,199 B1
(45) Date of Patent: Aug. 11, 2020

(54) SELF-OPTIMIZING NETWORK FOR NARROWBAND INTERNET-OF-THINGS IN-BAND DEPLOYMENT MODES

(71) Applicant: Cisco Technology, Inc., San Jose, CA (US)

(72) Inventors: Santosh Ramrao Patil, Santa Clara, CA (US); Mark Grayson, Berkshire (GB); Gangadharan Byju Pularikkal, San Jose, CA (US); Akram Ismail Sheriff, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/265,036

(22) Filed: Feb. 1, 2019

(51) Int. Cl.
*H04W 24/02* (2009.01)
*H04W 52/24* (2009.01)
(Continued)

(52) U.S. Cl.
CPC .......... *H04W 24/02* (2013.01); *H04W 16/14* (2013.01); *H04W 52/247* (2013.01);
(Continued)

(58) Field of Classification Search
CPC ............. H04W 52/367; H04W 52/146; H04W 72/0473; H04W 72/0406; H04W 52/243;
(Continued)

(56) References Cited

U.S. PATENT DOCUMENTS

2002/0123349 A1* 9/2002 Miyoshi ................ H04W 52/24
455/450

2007/0253450 A1* 11/2007 Kuroda ................. H04W 52/24
370/500
(Continued)

FOREIGN PATENT DOCUMENTS

WO  2017136004 A1  8/2017
WO  2017220635 A1  12/2017

OTHER PUBLICATIONS

3GPP TS 36.302 V13.2.0, dated Jun. 2016 (Year: 2016).*
Petri Luoto et al., "Bit-Map Based Resource Partitioning in LTE-A Femto Deployment", IEEE International Conference on Communications (ICC), Jun. 2013, 5 pages.
(Continued)

*Primary Examiner* — Daniel Lai
(74) *Attorney, Agent, or Firm* — Edell, Shapiro & Finnan, LLC

(57) ABSTRACT

Techniques for optimizing performance of narrowband Internet-of-Things (NB-IoT) devices in a wireless wide area network (WWAN) are described. In one embodiment, a method includes providing a NB-IoT base station in an in-band deployment mode to operate within a WWAN. The NB-IoT base station is configured to use a physical resource block of the WWAN for communicating with a plurality of NB-IoT devices. The method includes causing a reduction of a power level for a transmission from an initial power level to a first reduced power level. The method includes obtaining parameters associated with performance and throughput for the WWAN and comparing the parameters to a quality threshold. Based on the comparison of the parameters to the threshold, the method includes determining whether or not to reduce the power level for the physical resource block from the first reduced power level to a second reduced power level.

18 Claims, 16 Drawing Sheets

(51) Int. Cl.
*H04W 72/12* (2009.01)
*H04W 16/14* (2009.01)
*H04W 52/26* (2009.01)
*H04W 52/36* (2009.01)

(52) U.S. Cl.
CPC ......... *H04W 52/265* (2013.01); *H04W 52/36* (2013.01); *H04W 72/121* (2013.01)

(58) Field of Classification Search
CPC . H04W 52/50; H04W 72/042; H04W 52/143; H04W 52/241; H04W 52/325; H04W 52/0206; H04W 52/06; H04W 72/082; H04W 24/02; H04W 52/08; H04W 52/244; H04W 52/24; H04W 88/10; H04W 28/08; H04W 72/1215; H04W 52/221; H04W 52/247; H04W 52/16; H04W 52/245; H04W 52/362; H04W 24/00; H04W 52/12; H04W 52/36; H04W 84/18; H04W 28/02; H04W 52/02; H04W 52/20; H04W 52/225; H04W 52/265; H04W 52/48; H04W 16/14; H04W 72/121; H04L 1/00; H04L 5/006; H04L 1/0026
See application file for complete search history.

(56) References Cited

U.S. PATENT DOCUMENTS

| | | | |
|---|---|---|---|
| 2010/0110994 A1* | 5/2010 | Ratsuk | H04B 1/713 370/329 |
| 2012/0122512 A1* | 5/2012 | Nammi | H04W 52/243 455/522 |
| 2015/0257051 A1* | 9/2015 | Rao | H04W 36/0061 455/439 |
| 2017/0127357 A1* | 5/2017 | Kobayashi | H04W 52/146 |
| 2017/0238292 A1 | 8/2017 | Rico Alvarino et al. | |
| 2019/0104416 A1* | 4/2019 | Yerramalli | H04W 72/042 |

OTHER PUBLICATIONS

JianHuaWu, "CAT-M & NB-IoT Design and Conformance Test", Keysight Technologies, Jun. 14, 2017, 53 pages.
Rohde & Schwarz MNT, "Pioneers in NB-IoT testing What do you really need to know? The most important facts and solutions.", PD 5215.8712.92 Version 01.01, Jun. 2018, 16 pages.
4G Americas, "Self-Optimizing Networks: The Benefits of SON in LTE", Jul. 2011, 69 pages.
5G Americas Whitepaper, "Wireless Technology Evolution Transition from 4G to 5G", 3GPP Releases 14 to 16, Oct. 2018, 271 pages.

* cited by examiner

SELF-OPTIMIZING NETWORK FOR NARROWBAND INTERNET-OF-THINGS IN-BAND DEPLOYMENT MODES

TECHNICAL FIELD

This disclosure relates to wireless communication networks.

BACKGROUND

The Internet of Things (IoT) generally refers to the devices and machines embedded with electronics and software enabling these devices and machines to exchange data over a network (e.g., the Internet). Narrowband IoT (NB-IoT) is a Low Power Wide Area Network (LPWAN) radio technology standard developed by $3^{rd}$ Generation Partnership Project (3GPP). NB-IoT has been designed to address use cases requiring low-throughput, high-delay tolerance, and low-power transmissions from a large number of deployed NB-IoT devices, including some battery powered NB-IoT devices. NB-IoT uses a subset of the frequency spectrum allocated to Long-Term Evolution (LTE), but is limited to a narrowband of 200 kHz.

NB-IoT may be implemented in three deployment modes, including a guard band mode, an in-band mode, and a standalone mode. Guard band mode uses bandwidth that is reserved in the guard band of an existing LTE network frequency spectrum. In-band mode uses a physical resource block in the LTE carrier of an existing LTE network frequency spectrum. Standalone mode uses a separate 200 kHz carrier outside of the existing LTE network frequency spectrum.

DESCRIPTION OF EXAMPLE EMBODIMENTS

Overview

Figure 1:
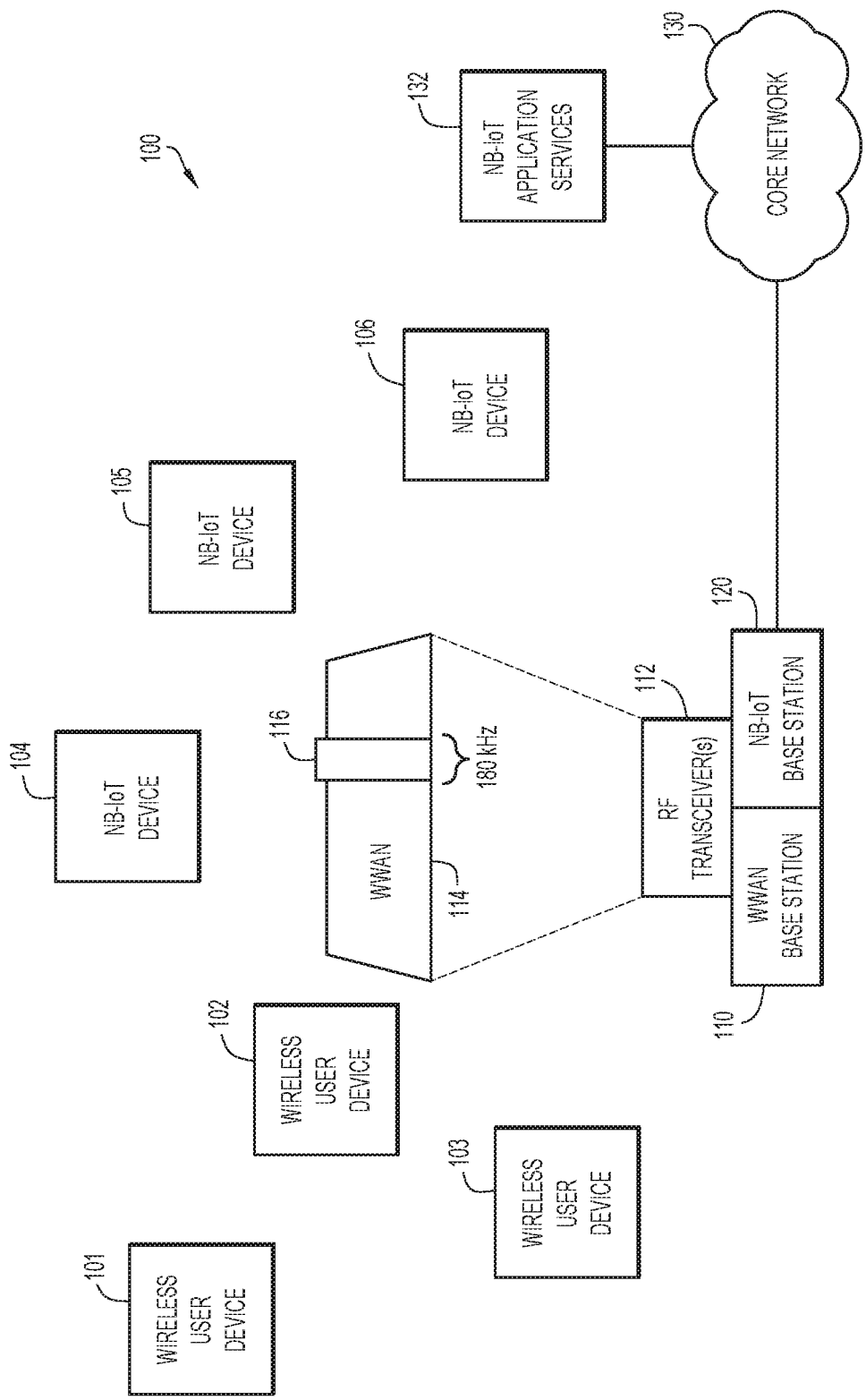
FIG. 1 is a diagram illustrating a NB-IoT in-band deployment mode in a wireless wide area network, according to an example embodiment.

Presented herein are techniques for optimizing performance of NB-IoT devices configured in an in-band deployment mode in a wireless wide area network. In an example embodiment, a method includes providing a NB-IoT base station in an in-band deployment mode to operate within a wide area wireless network (WWAN). The NB-IoT base station is configured to use a physical resource block of the WWAN for communicating with a plurality of NB-IoT devices. The method also includes causing, by the NB-IoT base station, a reduction of a power level for a transmission using the physical resource block from an initial power level to a first reduced power level. The method includes obtaining, by the NB-IoT base station, parameters associated with performance and throughput for the WWAN and comparing, by the NB-IoT base station, the parameters to a quality threshold. Based on the comparison of the parameters to the threshold, the method further includes determining, by the NB-IoT base station, whether or not to reduce the power level for the physical resource block from the first reduced power level to a second reduced power level.

Example Embodiments

Due to the unique characteristics of NB-IoT, there is a need for specially designed self-optimizing networks (SON) for NB-IoT deployment optimizations. The techniques described herein provide SON enhancements for optimizing performance of NB-IoT devices configured in an in-band deployment mode in a wireless wide area network.

3GPP LTE Release 14 specifications were developed to deliver enhanced user experience in selected areas through the addition of features such as increased positioning accuracy, increased peak data rates, the introduction of a lower device power class, improved non-anchor carrier operation, multicast, and authorization of coverage enhancements. However, several problems remain to be addressed. For example, user equipment (UE) in power saving mode is not available or immediately reachable for mobile terminating services. There are many NB-IoT sensors and devices that go into power saving mode in parking use cases and/or if they are not able to terminate an IoT service with a mobile NB-IoT base station. Additionally, radio resource management and optimization for NB-IoT devices in a SON for different types of UEs with different coverage enhancement levels are not covered by the 3GPP Release 14 specifications.

The techniques of the example embodiments described herein provide several benefits for NB-IoT device deployments, including providing mobility support for no connected mode, less signaling traffic and overhead, power save mode during device transmit, receive, and idle mode operations, and leverage the use of Narrowband Physical Random Access Channel (NPRACH) for NB-IoT devices.

The main challenge in radio resource management and/or SON for LTE and NB-IoT deployments is that the information used to control the LTE radio frequency link performance and coverage is spread across all of the protocol layers, from Signal-Information Blocks (SIB) in layer 3 (e.g., radio resource control) to the downlink control information (DCI) content in layer 1 (i.e., the physical layer) of the LTE stack. To decode and collect this information from all three of these layers takes processing time for a 5G high density IoT deployment.

Existing SON solutions for 3G and LTE networks takes a snapshot of the network, performs baselining of the network, and then takes action for optimization of the network. These existing solutions also typically have a closed loop feedback mechanism to check the result of the applied action and make decisions whether to commit to the action and move on, or to revert the changes.

However, these existing SON optimization solutions are insufficient for a dense 5G IoT deployment with many NB-IoT devices and/or sensors that are spread out and competing for radio resources. Such NB-IoT-based use cases would benefit from a new approach for SON to handle dense NB-IoT deployments. The embodiments described herein provide techniques for optimizing performance of NB-IoT devices configured in an in-band deployment mode in a wireless wide area network.

According to the techniques of the present embodiments, a SON-based radio resource management solution for 5G NB-IoT deployments may provide several optimizations for NB-IoT-based use cases, including, but not limited to: power optimization with power boost step down, coverage enhancement level based optimization, physical resource block optimization for interference mitigation, and/or leveraging relative narrowband transmit power (RNTP) information element (IE) for power optimization for roaming NB-IoT devices.

According to the principles of the example embodiments described herein, techniques for using self-optimizing networks in a wireless communication network for optimizing NB-IoT in-band deployment modes scenarios are presented.

Power Boost Step Down Optimization

Referring now to FIGS. 1-4, techniques for power optimization with power boost step down are illustrated, according to an example embodiment. In a NB-IoT in-band deployment mode scenario, a NB-IoT base station is anchored in a parent LTE cell and borrows power from that parent LTE cell to serve all of the NB-IoT devices. In such in-band deployment mode scenarios, a blind increase in signal power value results in excess power being provided to the NB-IoT physical resource block at the expense of power for the rest of the parent LTE band. This reduction in power can adversely affect performance of the parent LTE cell where LTE devices, such as smart phones or mobile clients/devices, are served, which are already in a connected mode, thereby resulting in a reduction of throughput at the parent LTE cell edge.

FIG. 1 is a diagram illustrating an environment 100 in which techniques for power optimization with power boost step down may be implemented according to an example embodiment. In one embodiment, environment 100 includes a plurality of user devices, including one or more wireless user devices and one or more NB-IoT devices. Examples of plurality of user devices may include, but are not limited to: mobile devices, cell phones, tablets, printers, computers, consumer electronics, NB-IoT devices, IoT devices, as well as other devices that include equipment to establish a connection with a WWAN. In this embodiment, the one or more wireless user devices include at least a first wireless user device 101, a second wireless user device 102, and a third wireless user device 103. The one or more NB-IoT devices include at least a first NB-IoT device 104, a second NB-IoT device 105, and a third NB-IoT device 106. It should be understood that environment 100 may include additional user devices, including additional wireless user devices and/or NB-IoT devices.

In this embodiment, environment 100 includes a wireless wide area network base station 110 for a wireless wide area network (WWAN). In some embodiments, the WWAN may be configured in compliance with $4^{th}$ generation (4G), Long-Term Evolution (LTE), and/or $5^{th}$ generation (5G) wireless wide area network specifications. Additionally, environment 100 includes a NB-IoT base station 120 (e.g., an eNodeB or "eNB") that is anchored to WWAN base station 110. In an example embodiment, NB-IoT base station 120 may share radio resources, such as RF transceivers 112, with WWAN base station 110.

As described above, in the example embodiments described herein, NB-IoT base station 120 and a plurality of NB IoT devices (e.g., first NB-IoT device 104, second NB-IoT device 105, and third NB-IoT device 106) are configured in an in-band deployment mode with the WWAN. Accordingly, in this in-band deployment mode, NB-IoT base station 120 uses a physical resource block (PRB) 116 in the carrier of a frequency spectrum 114 allocated to the WWAN network for communicating with the plurality of NB-IoT devices 104, 105, 106.

In this embodiment, plurality of NB-IoT devices 104, 105, 106 are connected to PRB 116 of WWAN through NB-IoT base station 120, which allows any of these devices to communicate with remote servers, for example, NB-IoT application services 132 or other destinations, via the Internet outside of a core network 130 of the WWAN.

In an example embodiment, NB-IoT base station 120 uses channel feedback from NB-IoT devices (e.g., plurality of NB-IoT devices 104, 105, 106) to determine modulation and coding scheme allocations. Each NB-IoT device reports Hybrid Automatic Repeat Requests (HARQ) feedback and Channel Quality Indicator (CQI) values to NB-IoT base station 120 using a Physical Uplink Control Channel (PUCCH) or Physical Uplink Shared Channel (PUSCH). In some cases, each downlink HARQ process may have variable timing. NB-IoT base station 120 can begin transmitting to one or more NB-IoT devices (e.g., plurality of NB-IoT devices 104, 105, 106) as soon as it receives the acknowledgements (i.e., ACK/NACK) from the NB-IoT devices, depending on availability of PRB 116.

According to the techniques presented herein, a power optimization mechanism is provided to minimize the effect of NB-IoT base station 120 on its parent WWAN cell (e.g., WWAN base station 110) and neighboring cells by adjusting a power boost to optimize an amount of excess power on the NB-IoT PRB (e.g., PRB 116). HARQ NACKs, as described above, result in retransmissions, and in a high-density NB- IoT deployment (e.g., environment 100, shown in FIG. 1), these retransmissions will consume more WWAN airtime. Such retransmissions can affect a mission critical sensor in receiving control signals in a downlink direction to transmit a payload. As part of the power optimization mechanism presented herein, the NB-IoT power boost can be moved to the lowest value on the NB-IoT base station (e.g., NB-IoT base station 120) so that a maximum desired maximum coupling loss (MCL) of 164 dB for a NB-IoT device is achieved.

Figure 2A:
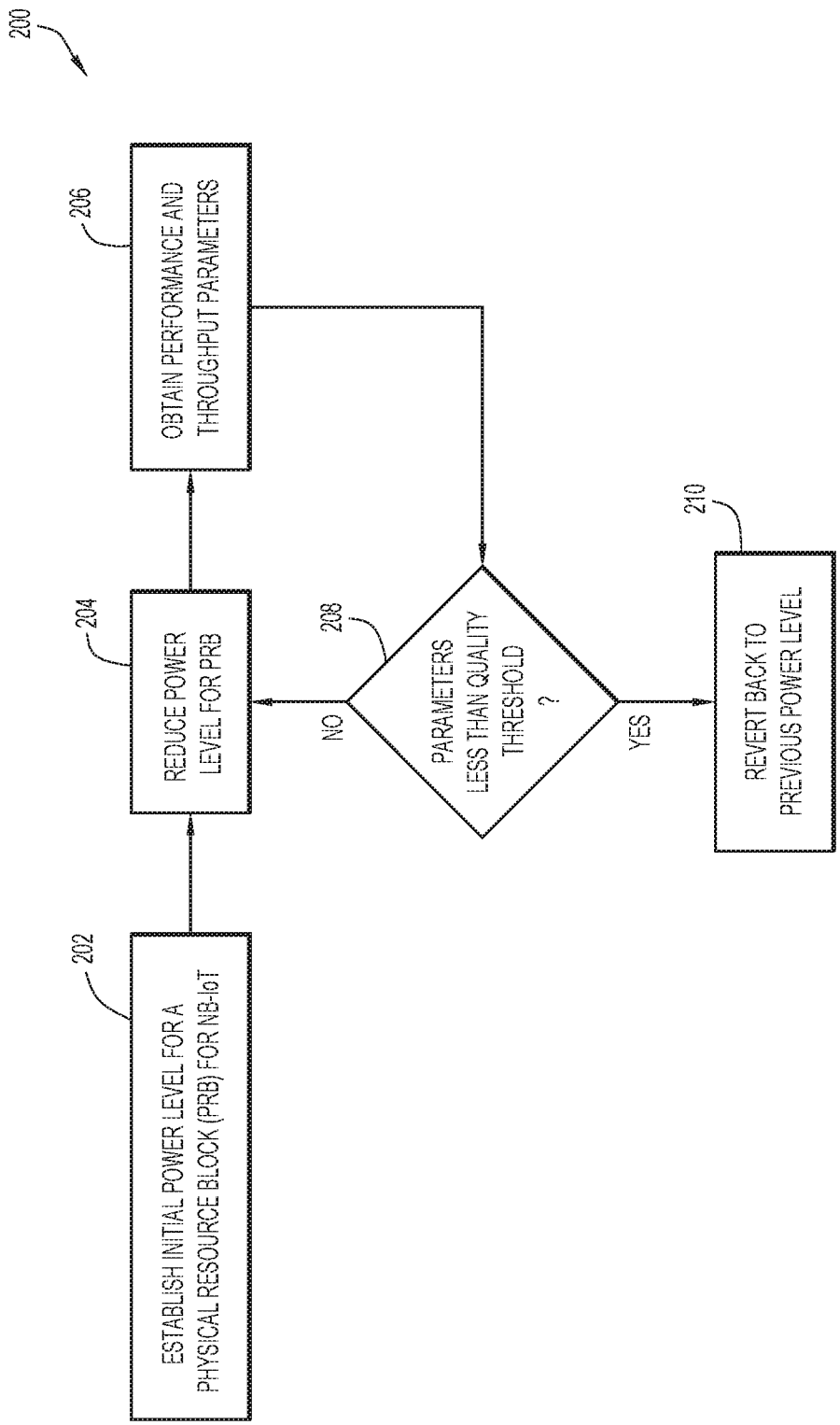
FIG. 2A is a flowchart illustrating a technique for a power boost step down optimization for NB-IoT devices configured in an in-band deployment mode in a wireless wide area network, according to an example embodiment.

Referring now to FIG. 2A, a flowchart illustrating a method 200 for a power boost step down optimization mechanism for NB-IoT devices configured in an in-band deployment mode in a wireless wide area network is shown according to an example embodiment. In some embodiments, method 200 may be implemented by a NB-IoT base station (e.g., NB-IoT base station 120). In this embodiment, method 200 includes an operation 202 where an initial power level is established for a PRB allocated for the NB-IoT deployment (e.g., PRB 116, as shown in FIG. 1 above).

Next, method 200 includes an operation 204 where a power level for the PRB is reduced from the initial power level established at operation 202. In one embodiment, the initial power level may be reduced by a predetermined amount to a first reduced power level. For example, power boost levels for a PRB may be reduced in one or more step decreases of a predetermined amount, which may be based on a pre-allocated map or lookup table stored at the NB-IoT base station.

After each step decrease of power boost level reduction (i.e., after each iteration of operation 204), closed loop feedback may be checked with the parent WWAN cell (e.g., WWAN base station 110) for effects on performance and throughput as compared with the child NB-IoT cell's performance (e.g., NB-IoT base station 120). For example, method 200 includes an operation 206 wherein performance and throughput parameters are obtained for the WWAN cell and NB-IoT cell. At an operation 208, the parameters obtained at operation 206 are compared to a quality threshold. For example, the quality threshold at operation 208 may be associated with RF link characteristics, so that operation 208 analyzes the degradation effects from the step down in power level at the RF link level.

At operation 208, whether or not the parameters are less than the quality threshold is determined. Upon determining at operation 208 that the parameters are not less than the quality threshold (i.e., the degradation at the RF link level is still within an acceptable value), then method 200 proceeds back to operation 204. At operation 204, another step down decrease in the power level for the PRB may be performed (e.g., reducing power level from the first reduced power level to a second reduced power level), and the effects of that reduction evaluated again at operation 206, where updated parameters associated with performance and throughput are obtained based on the further reduced power level and evaluated against the quality threshold at operation 208.

Upon determining at operation 208 that the parameters are less than the quality threshold (i.e., the degradation at the RF link level has fallen below an acceptable value), then method 200 may proceed to an operation 210. At operation 210, the last change to the power levels for the PRB are reverted (i.e., changed back to the previous power level). With this arrangement, method 200 allows the NB-IoT base station to adaptively determine whether to make additional decreases in power boost levels or to revert the last iteration of changes to the previous level.

These techniques for power optimization with power boost step down provided by method 200 clear more power resources for a parent WWAN cell (e.g., WWAN base station 110) and improves its performance. Additionally, this mechanism for power boost optimization also reduces interference on the PRB (e.g., PRB 116) allocated to the NB-IoT in-band deployment with the other bands within the WWAN (e.g., WWAN 114) serving the wireless user devices (e.g., plurality of wireless user devices 101, 102, 103). Method 200 is able to provide harmonious co-existence of the traditional WWAN bands and the NB-IoT deployment.

Figure 2B:
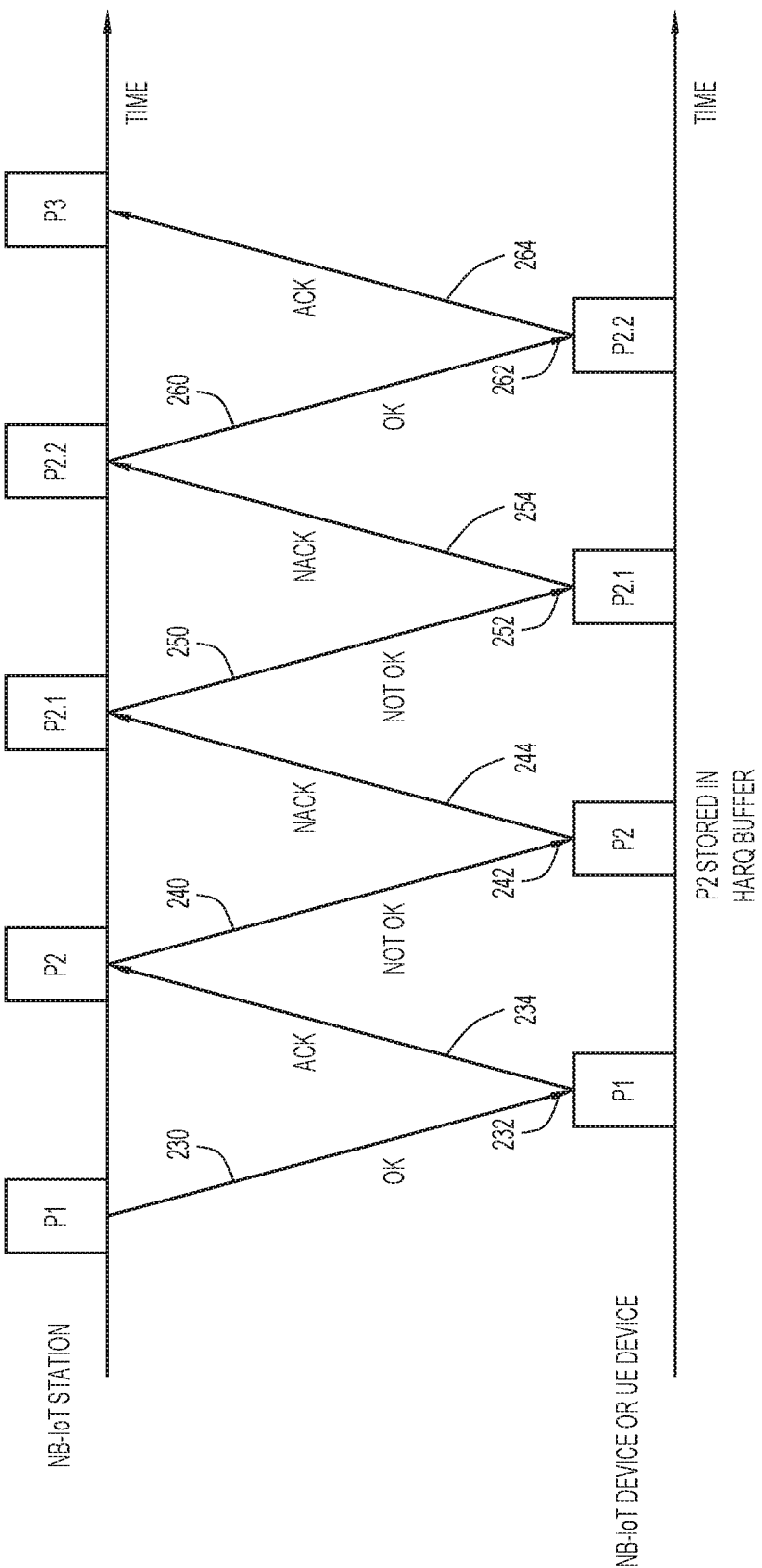
FIG. 2B is a diagram depicting a modified HARQ retransmission process according to an example embodiment.

Turning to FIG. 2B, a diagram is shown of a modified HARQ retransmission process according to an example embodiment. HARQ Negative Acknowledgements (NACKs) result in retransmissions. In a high density IoT deployment, many such retransmissions will consume more air time which can affect a mission critical sensor in receiving a control signal sent in the downlink direction to transmit a payload. In FIG. 2B, the top line represents a NB-IoT base station and the bottom line represents a NB-IoT device or a user device. In FIG. 2B, P1 represents a transmission attempt for a first packet from the NB-IoT base station, P2 represents a transmission attempt for a second packet from the NB-IoT base station, P3 represents a transmission attempt for a third packet. P2.1 represents a second transmission attempt of the second packet P2 and P2.2 represents a third transmission attempt of second packet P2. In general, HARQ can have a maximum of 4 transmission.

In FIG. 2B, packet P1 transmitted at 230 from the NB-IoT base station, and it is received normally and stored at the NB-IoT device or user device. At 234, an ACK is sent to the NB-IoT base station. At 240, the NB-IoT device transmits packet P2 and it is not successfully received by the NB-IoT device or user device. At 242, whatever portion of packet P2 that was successfully received is stored in a HARQ buffer at the NB-IoT device or user device. At 244, the NB-IoT device or user device ends a NACK to the NB-IoT base station. At 250, the NB-IoT base station retransmits packet P2 (referred to as P2.1). At 252, whatever portion of packet P2.1 that was successfully received at the NB-IoT device or user device is stored in its HARQ buffer. At 254, the NB-IoT device or user device sends a NACK to the NB-IoT base station. At 260, the NB-IoT base station transmits packet P2 again (referred to as P2.2). At 262, the NB-IoT device or user device stores packet P2.2. At 264, the NB-IoT device or user device sends an ACK to the NB-IoT base station.

User devices and NB-IoT devices handled by the same base station are classified, and the HARQ retry transmission count is changed. As a result, for example:

P1+P1.1=P1 meaning packet P1 is a derived based on a combination of P1 and P1.1. In the example of FIG. 2B, there is no P1.1 because P1 was received successfully at 230 and 232.

P2+P2.1=P2 meaning packet P2 is based on a combination of P2 and P2.2.

P2+P2.1+P2.2=P2 meaning packet P2 is based on a combination of P2, P2.1 and P2.2.

Figure 3:
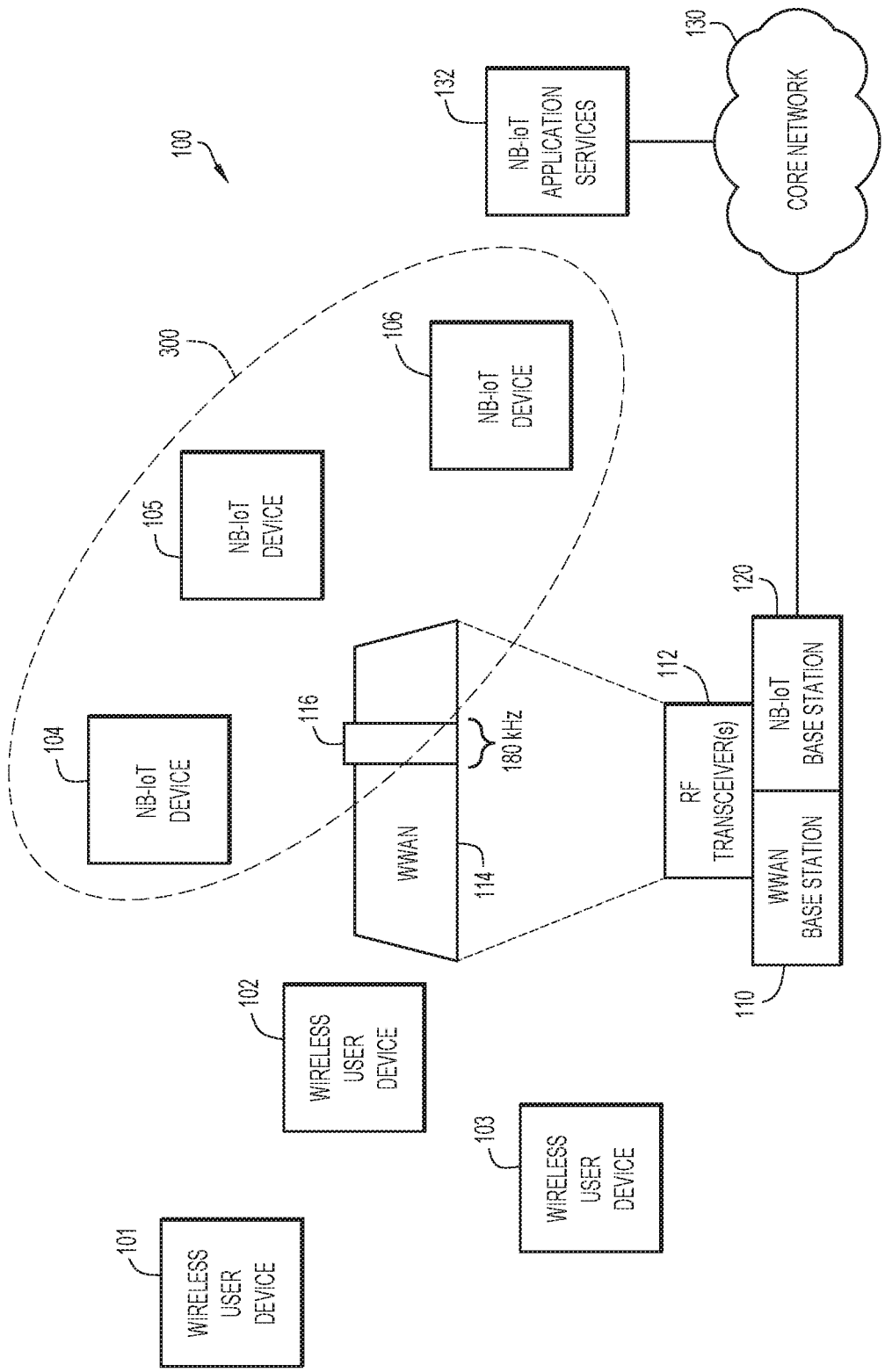
FIG. 3 is a diagram illustrating identification of NB-IoT devices in a wireless wide area network, according to an example embodiment.

In some embodiments, NB-IoT devices in an in-band deployment mode may be identified and grouped together so that the optimizations described herein may be applied to the group of NB-IoT devices as a whole. For example, method 200 may be applied to reduce the power levels for the PRB assigned to a group of NB-IoT devices. Referring now to FIG. 3, a diagram illustrating identification of NB-IoT devices 104, 105, 106 in the WWAN is shown according to an example embodiment.

In some embodiments, a transmission on a physical random access channel (PRACH) may be used to differentiate NB-IoT devices (e.g., plurality of NB-IoT devices 104, 105, 106) from other wireless user devices in environment 100 (e.g., plurality of wireless user devices 101, 102, 103) based on the repetition rate of the PRACH transmission. For example, NB-IoT devices have a repetition rate for the PRACH transmission from 1, 2, 4, up to 128 times maximum in the uplink direction. Repetitive transmissions from an NB-IoT device (e.g., plurality of NB-IoT devices 104, 105, 106) are performed for almost every channel. However, for other devices (e.g., plurality of wireless user devices 101, 102, 103), only time and interval bundling is an intentional repetitive transmission, all other transmissions are intended for single repetition only and not multiple repetitions.

In some embodiments, a SON agent associated with NB-IoT base station 120 can monitor and analyze a repetition rate of transmissions made on the PRACH. Depending on the determined repetition rate on the PRACH, a NB-IoT device can be differentiated from other wireless user devices. That is, if a repetition rate of at least one and up to 128 is determined for a PRACH transmission, then a device of plurality of NB-IoT devices 104, 105, 106 is identified as an NB-IoT device. The identified NB-IoT devices may then be associated in a group 300. For example, as shown in FIG. 3, group 300 includes first NB-IoT device 104, second NB-IoT device 105, and third NB-IoT device 106.

In one embodiment, identifying the plurality of NB-IoT devices 104, 105, 106 includes monitoring Signal-Information Blocks in the PRACH transmission made by a device of plurality of NB-IoT devices 104, 105, 106. In another embodiment, identifying the plurality of NB-IoT devices 104, 105, 106 may also be based on a coverage enhancement level used for an application session between a NB-IoT device and the NB-IoT base station determined during the random access channel (RACH) transmission phase.

According to the techniques described herein, the NB-IoT device grouping is based on channel feedback calculation and sending the channel feedback to the NB-IoT base station (e.g., NB-IoT base station 120). Additionally, grouping of NB-IoT devices (e.g., group 300) may be based on Signal-Information Blocks and/or coverage enhancement levels.

Figure 4:
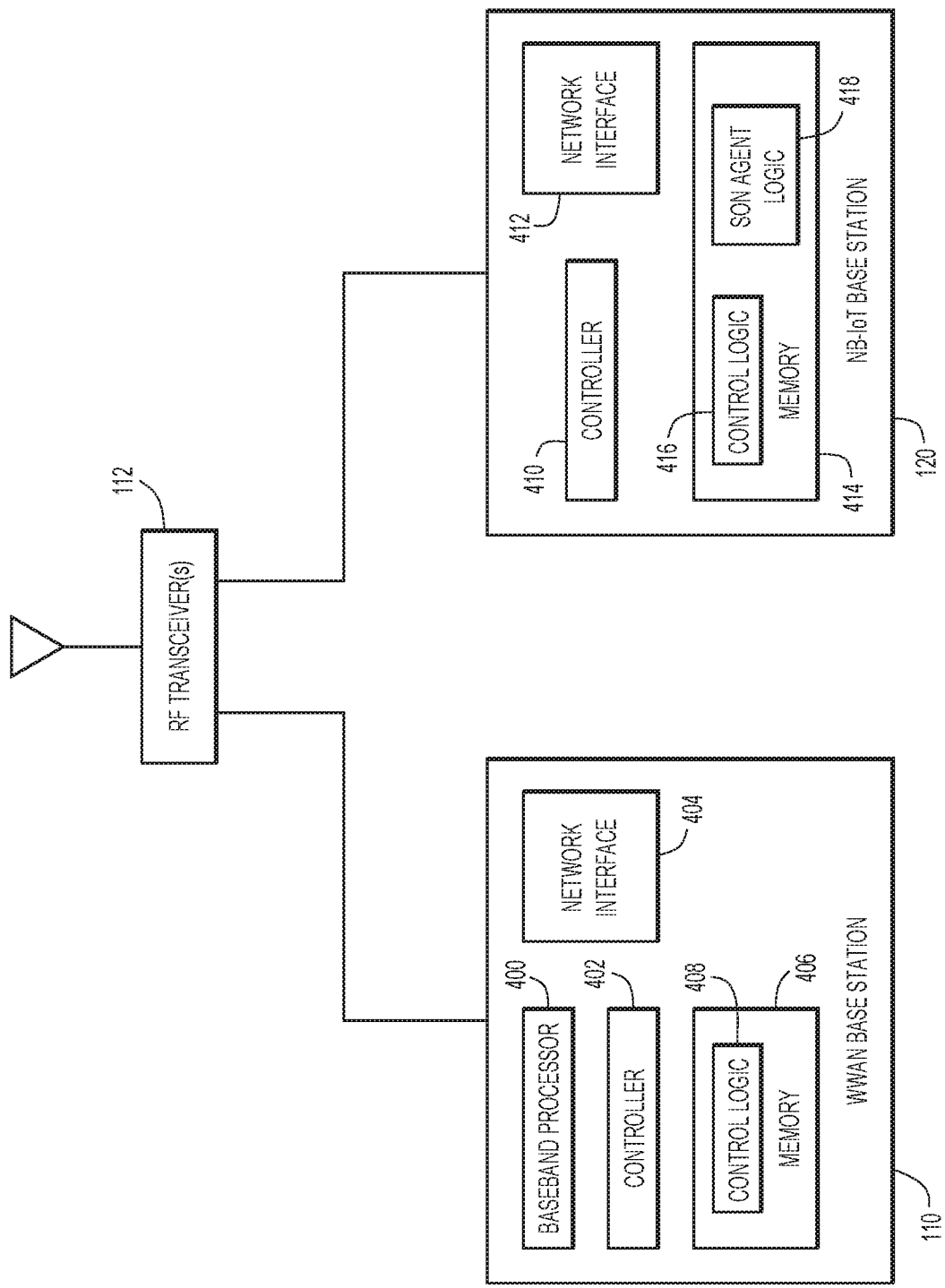
FIG. 4 is a block diagram illustrating a NB-IoT base station associated with a wireless wide area network base station, according to an example embodiment.

FIG. 4 illustrates an example block diagram of a NB-IoT base station (e.g., NB-IoT base station 120) anchored to a parent WWAN cell (e.g., WWAN base station 110) that may be configured to implement techniques for optimizing performance of NB-IoT devices configured in an in-band deployment mode in a wireless wide area network, according to the principles of the embodiments described herein.

In some embodiments, NB-IoT base station 120 may be anchored to WWAN base station 110 and may share radio resources with WWAN base station 110. For example, NB-IoT base station 120 and WWAN base station 110 may share RF transceiver(s) 112. WWAN base station 110 may have multiple antennas and RF transceiver 112 may have multiple transmitters and receivers, one for each antenna. RF transceiver 112 performs down converting to baseband of received radio frequency signals and up converting to radio frequency of baseband transmit signals.

In this embodiment, WWAN base station 110 may include a baseband processor (modem) 400, a controller (microprocessor or microcontroller) 402, a network interface 404, and a memory 406 that stores instructions for control logic 408. The baseband processor 400 performs baseband modulation to produce baseband transmit signals and baseband demodulation of received baseband receive signals. The baseband processor 400 may also perform various media access control (MAC) functions. The RF transceiver 112 and baseband processor 400 may be embodied as part of integrated circuit (IC) chipsets that are compliant with IEEE 802.11, for example. In some embodiments, NB-IoT base station 120 may also share functions of baseband processor 400 with WWAN base station 110.

Controller 402 performs higher-level control of WWAN base station 110 and to this end executes instructions for the control logic 408 stored in memory 406. The network interface 404 is a network interface card (NIC) that enables wired network communication via a LAN (not shown) or other network connections. Control logic 408 may be configured to implement one or more conventional functions of WWAN base station 110 for operation of the WWAN.

In this embodiment, NB-IoT base station 120 may include a controller (microprocessor or microcontroller) 410, a network interface 412, and a memory 414 that stores instructions for control logic 416 and SON agent logic 418. In some embodiments, NB-IoT base station 120 may also share functions of baseband processor 400 with WWAN base station 110. Controller 410 performs higher-level control of NB-IoT base station 120 and to this end executes instructions for control logic 416 stored in memory 414. The network interface 412 is a network interface card (NIC) that enables wired network communication via a LAN (not shown) or other network connections. Control logic 416 may be configured to implement one or more functions of NB-IoT base station 120. In some embodiments, SON agent logic 418 is configured to implement one or more operations associated with the techniques for optimizing performance of NB-IoT devices configured in an in-band deployment mode in a wireless wide area network described herein, including operations associated with the techniques of the present embodiments described in reference to FIGS. 1-3 above, as well as FIGS. 5-13 described in detail below.

Dynamic Selection of Coverage Enhancement Level

Referring now to FIGS. 5-8, techniques for coverage enhancement level based optimization of NB-IoT devices configured in an in-band deployment mode in a wireless wide area network are provided. For coverage purposes, NB-IoT specifications include the concept of coverage enhancement levels. Coverage enhancement is achieved not by raising power levels of transmitter antennas of a NB-IoT base station, but instead by advantageously combining transmission repetitions.

Three coverage enhancement levels are provided, expressed in terms of maximum coupling loss (MCL) values, including: a coverage enhancement level 0 (also referred to as "Normal") associated with a MCL value of 144 dB, a coverage enhancement level 1 (also referred to as "Robust") associated with a MCL value of 154 dB, and a coverage enhancement level 2 (also referred to as "Extended") associated with a MCL value of 164 dB.

MCL is a common measure to describe an amount of coverage a WWAN system or other RF system design can support without adversely affecting performance. MCL is calculated based on four inputs: device power amplifier power, receiver noise figure (NF), occupied channel bandwidth, and required signal to noise ratio (SNR) at the device end point or sensor.

When sending data to a NB-IoT base station (e.g., NB-IoT base station 120), some NB-IoT devices use two repetitions, some use four repetitions, and some use more, as described above. There are no techniques for optimization in the 3GPP Release 14 specifications for dynamically fixing an NRSRP threshold base on a polling repetition count by a NB-IoT device. The techniques for coverage enhancement level based optimization of NB-IoT devices provided herein leverage repetition rates for one or more groups of NB-IoT devices to improve coverage enhancement levels.

Figure 5:
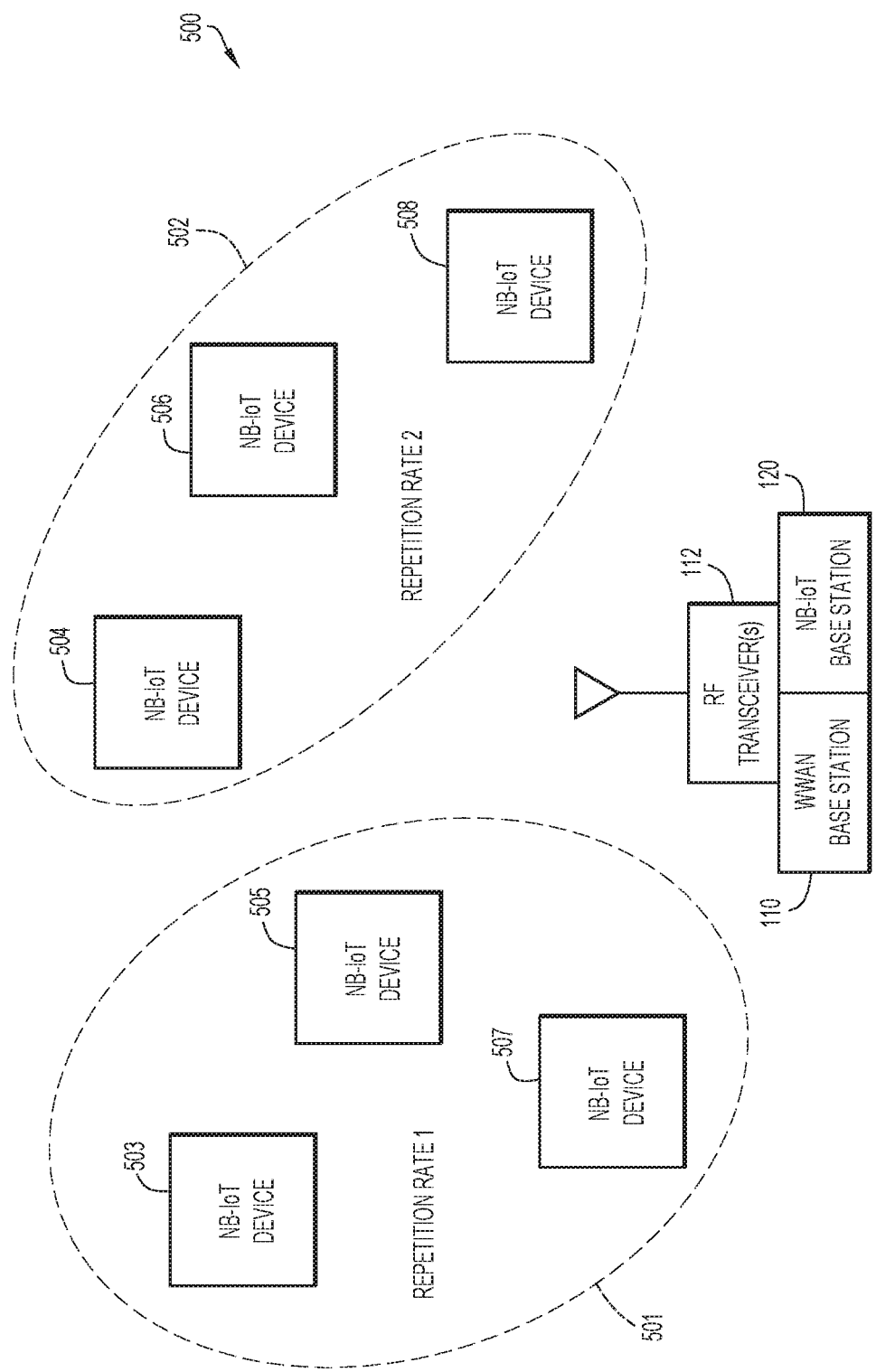
FIG. 5 is a diagram illustrating assignment of groups of NB-IoT devices in a wireless wide area network based on repetition rates, according to an example embodiment.

FIG. 5 is a diagram illustrating assignment of groups of NB-IoT devices in a wireless wide area network environment 500 based on repetition rates, according to an example embodiment. In an example embodiment, environment 500 is a NB-IoT in-band deployment within a WWAN, for example, the WWAN described above in reference to FIG. 1. In this embodiment, environment 500 includes NB-IoT base station 120 anchored to WWAN base station 110, including shared RF transceiver 112. Additionally, environment 500 includes a plurality of NB-IoT devices in communication with NB-IoT base station 120.

As described above, a repetition rate of transmissions made on the PRACH by one or more of the plurality of NB-IoT devices may be monitored and analyzed. Using these obtained repetition rates, one or more NB-IoT devices with the same repetition rates may be grouped together. As shown in FIG. 5, a first device group 501 of NB-IoT devices are associated with a first repetition rate. In this embodiment, first device group 501 includes a first NB-IoT device 503, a second NB-IoT device 505, and a third NB-IoT device 507. Similarly, a second device group 502 of NB-IoT devices are associated with a second repetition rate that is different than the first repetition rate. In this embodiment, second device group 502 includes a fourth NB-IoT device 504, a fifth NB-IoT device 506, and a sixth NB-IoT device 508.

Figure 6:
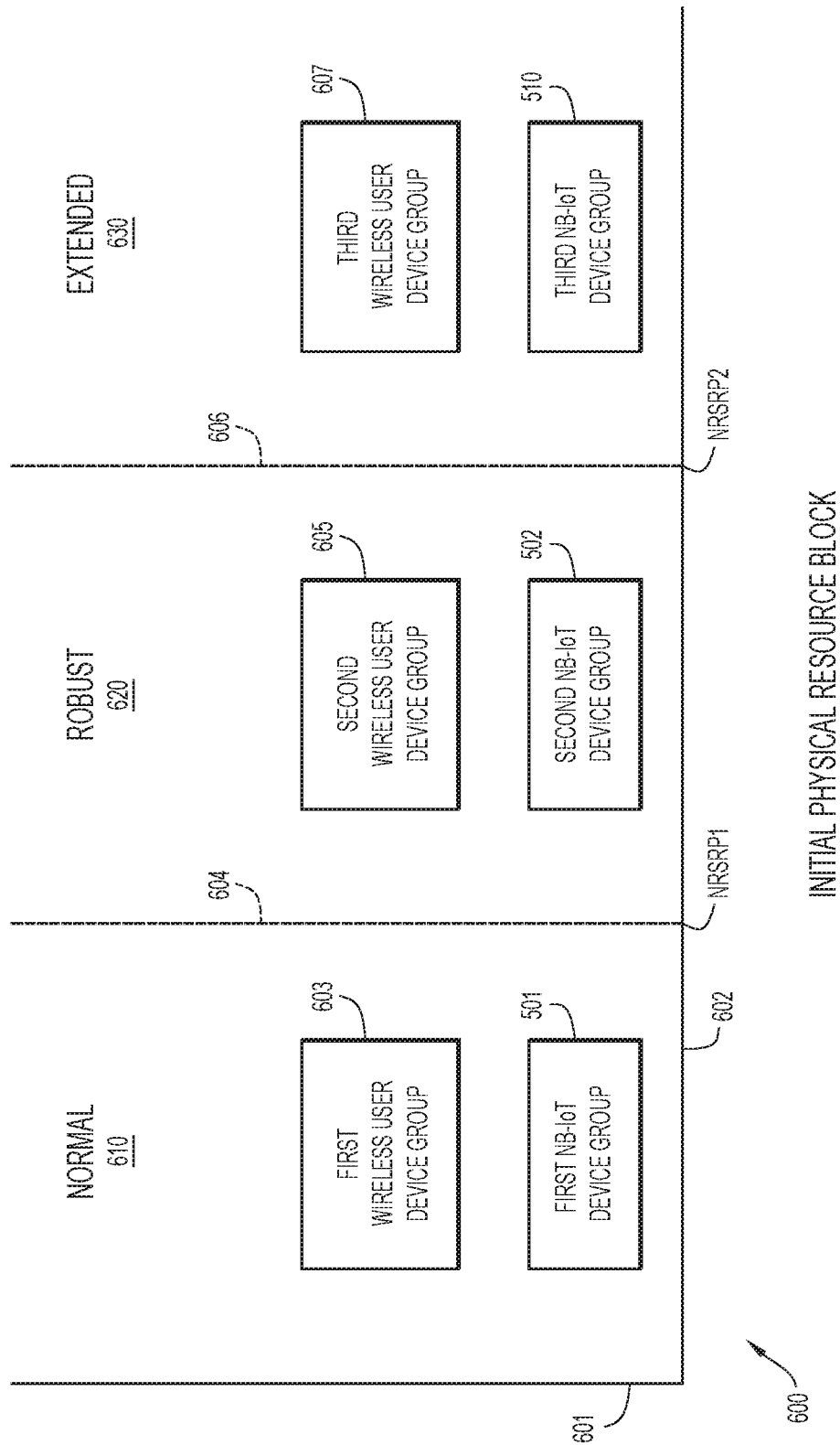
FIG. 6 is a diagram illustrating assignment of coverage enhancement levels to groups of NB-IoT devices, according to an example embodiment.

In an example embodiment, techniques for coverage enhancement level based optimization of NB-IoT devices take advantage of the same repetition rates shared by all NB-IoT devices in the same device groups (e.g., first device group 501 and second device group 502) to improve coverage enhancement levels for the NB-IoT devices. Referring now to FIG. 6, a diagram 600 illustrating the three coverage enhancement levels, as described above, is shown. In this embodiment, diagram 600 shows the relationship between received power level along a first axis 601 and a path loss (measured in dBm) along a second axis 602. The three coverage enhancement levels include a Normal enhancement level 610 associated with a MCL value of 144 dB, a Robust coverage enhancement level 620 associated with a MCL value of 154 dB, and an Extended coverage enhancement level 630 associated with a MCL value of 164 dB.

As illustrated in diagram 600, received power level along first axis 601 decreases relative to increasing path loss along second axis 602, i.e., from Normal enhancement level 610 to Robust coverage enhancement level 620 to Extended coverage enhancement level 630. The assigned coverage enhancement level determines the Narrowband Physical Random Access Channel (NPRACH) resources that are allocated to a device, including: subset of subcarriers, PRACH repetitions, maximum number of attempts a device may make. User equipment (i.e., wireless user devices and/or NB-IoT devices) derive their assigned coverage enhancement levels based on Narrowband Reference Signal Received Power (NRSRP) threshold value measurements. According to the 3GPP release 14 specifications, these NRSRP threshold values are static. For example, as shown in FIG. 6, a first threshold value 604 (NRSRP1) separates Normal enhancement level 610 from Robust coverage enhancement level 620. Additionally, a second threshold value 606 (NRSRP2) separates Robust coverage enhancement level 620 from Extended coverage enhancement level 630.

As shown in FIG. 6, upon selection of an initial physical resource block, coverage enhancement levels may be selected for one or more groups of devices. In this embodiment, measurements of NRSRP values are obtained for first device group 501 and second device group 502 based on the selection of the initial physical resource block of the WWAN spectrum (e.g., WWAN 114 shown in FIG. 1). Based on these NRSRP values, each device group is assigned to a coverage enhancement level. For example, if the measured NRSRP value is smaller than first threshold value 604 (NRSRP1) and smaller than second threshold value 606 (NRSRP2), then Normal enhancement level 610 is assigned. If the measured NRSRP value is between first threshold value 604 (NRSRP1) and second threshold value 606 (NRSRP2), then Robust coverage enhancement level 620 is assigned. Finally, if the measured NRSRP value is greater than second threshold value 606 (NRSRP2), then Extended coverage enhancement level 630 is assigned.

Based on the selection of the initial physical resource block, device groups are assigned to their coverage enhancement levels. In this embodiment, according to a first assignment, first device group 501 of NB-IoT devices is assigned to Normal enhancement level 610, a second device group 502 of NB-IoT devices is assigned to Robust coverage enhancement level 620 and a third NB-IoT group 510 is assigned to the Extended coverage enhancement level 630. Additionally, in a WWAN that includes other devices, for example, one or more wireless user devices as shown in FIG. 1, one or more groups of wireless user devices may also be assigned to coverage enhancement levels. For example, in this embodiment, a first wireless user device group 603 is assigned to Normal enhancement level 610, a second wireless user device group 605 is assigned to Robust enhancement level 620, and a third wireless user device group 607 is assigned to Extended coverage enhancement level 630. In one form, the wireless user device groups may be groups of LTE-UEs.

According to the techniques of the example embodiments described herein, a dynamic selection of coverage enhancement levels may be implemented by polling a different physical resource block to obtain an improved NPRACH resource allocation vector. Based on the device groups (e.g., first device group 501 and second device group 502), a new physical resource block may be selected and updated measurements of NRSRP values are obtained. In this embodiment, upon selection of the new physical resource block of the WWAN spectrum (e.g., WWAN 114 shown in FIG. 1) updated measurements of NRSRP values for first device group 501 and second device group 502 are obtained and used to dynamically change assignments of coverage enhancement levels.

Figure 7:
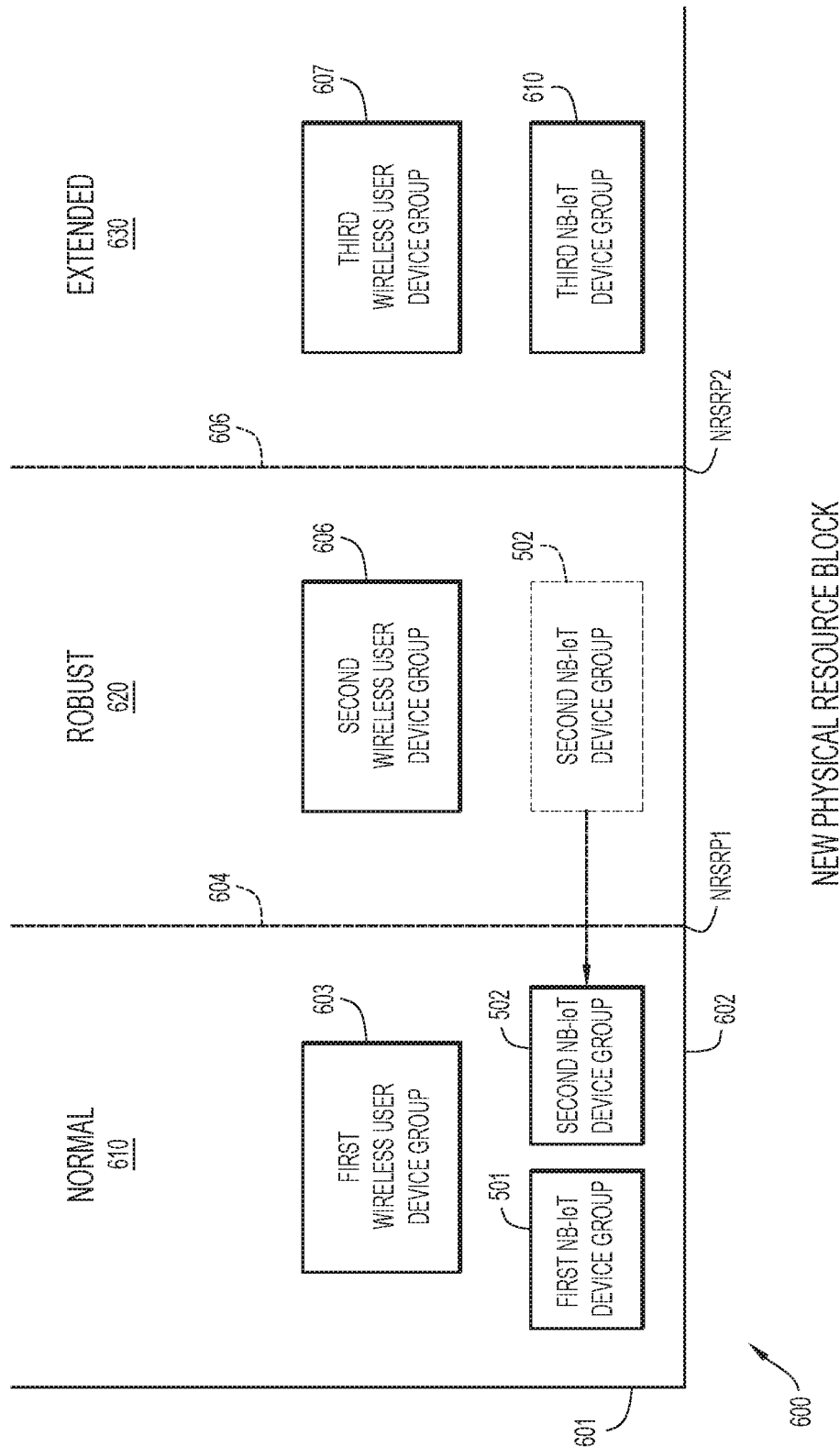
FIG. 7 is a diagram illustrating an updated assignment of coverage enhancement levels to groups of NB-IoT devices, according to an example embodiment.

Referring now to FIG. 7, diagram 600 is shown illustrating an updated assignment of coverage enhancement levels to groups of NB-IoT devices upon selection of a new physical resource block, according to an example embodiment. Based on the selection of the new physical resource block, device groups are re-assigned to coverage enhancement levels. In this embodiment, according to a second assignment, first device group 501 of NB-IoT devices remains assigned to Normal enhancement level 610 and the third group 510 of NB-IoT devices remains assigned to the Extended enhancement level 630. However, second device group 502 of NB-IoT devices is now also assigned to Normal enhancement level 610. In this embodiment, first wireless user device group 603, second wireless user device group 605, and third wireless user device group 607 remain assigned according to the previous assignments shown in FIG. 6.

With this arrangement, the path loss hysteresis curve can be polled and monitored based on the new physical resource block selection to obtain updated NRSRP measurements, which can be compared to the threshold values (i.e., first threshold value 604 (NRSRP1) and second threshold value 606 (NRSRP2)) to dynamically improve the assignment of coverage enhancement levels for NB-IoT device groups. This grouping of NB-IoT devices based on the dynamic comparison with the NRSRP threshold values can help reduce the airtime for sending control frames between NB-IoT devices and the NB-IoT base station. Multiple repetitions can increase the coverage of a NB-IoT device signal, by optimizing the number of repetitions needed by device groups, a NB-IoT base station can provide effective maximum coverage for a cell.

Figure 8A:
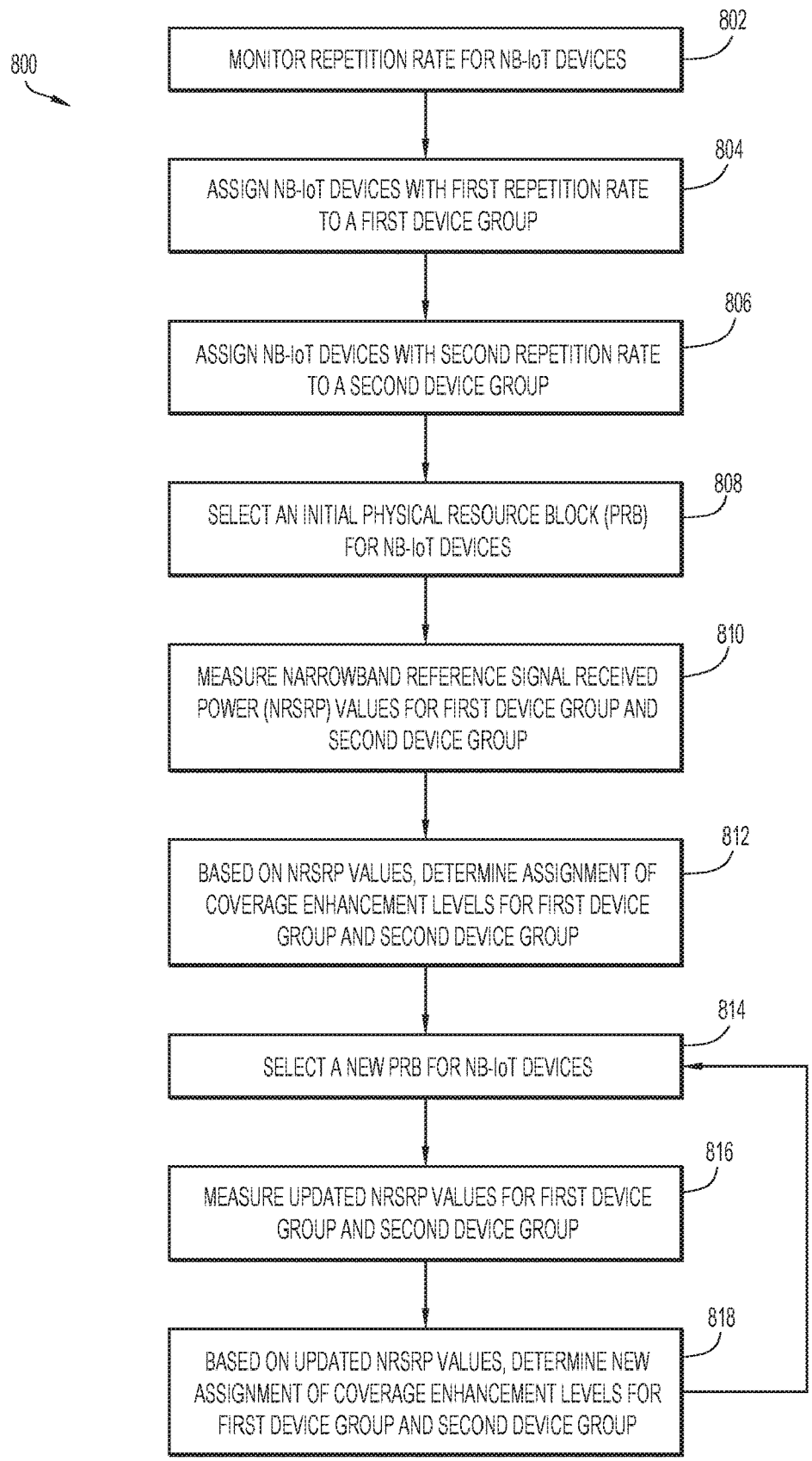
FIG. 8A is a flowchart of a method for dynamic selection of coverage enhancement level for NB-IoT devices, according to an example embodiment.

FIG. 8A is a flowchart of a method 800 for dynamic selection of coverage enhancement level for NB-IoT devices, according to an example embodiment. In some embodiments, method 800 may be implemented by a NB-IoT base station (e.g., NB IoT base station 120). In particular, in some embodiments, method 800 may be implemented by a SON agent associated with a NB-IoT base station.

Method 800 provides techniques for coverage enhancement level based optimization of NB-IoT devices. In this embodiment, method 800 begins at an operation 802 where a repetition rate for one or more NB-IoT devices is monitored or obtained. For example, as described above, a repetition rate associated with a PRACH transmission may be determined for a plurality of NB-IoT devices. Next, at an operation 804, method 800 includes assigning one or more NB-IoT devices associated with a first repetition rate to a first device group. For example, as described in reference to FIG. 5 above, first device group 501 associated with a first repetition rate includes first NB-IoT device 503, second NB-IoT device 505, and third NB-IoT device 507. At an operation 806, method 800 includes assigning one or more NB-IoT devices associated with a second repetition rate to a second device group. For example, as described in reference to FIG. 5 above, second device group 502 associated with a second repetition rate that is different than the first repetition rate includes fourth NB-IoT device 504, fifth NB-IoT device 506, and sixth NB-IoT device 508.

In some embodiments, operations of method 800 associated with determining and grouping NB-IoT devices into device groups based on repetition rates (i.e., operations 802, 804, 806) may be performed as part of other methods described herein. In such embodiments, one or more NB-IoT devices may already be grouped into device groups prior to starting method 800.

Method 800 includes an operation 808, where an initial physical resource block is selected for communication in the WWAN by the NB-IoT devices. Next, at an operation 810, measurements of NRSRP values for the first device group and the second device group are obtained. For example, as described above with reference to FIG. 6, NRSRP values for first device group 501 and second device group 502 may be obtained by NB-IoT base station 120.

Based on the NRSRP values obtained at operation 810, method 800 further includes an operation 812. At operation 812, method 800 includes determining a first assignment of coverage enhancement levels for each of the first device group and the second device group using the NRSRP values. For example, as described above in reference to FIG. 6, the NRSRP values for first device group 501 and second device group 502 are compared with first threshold value 604 (NRSRP1) and second threshold value 606 (NRSRP2) to determine the assignment to one of Normal enhancement level 610, Robust coverage enhancement level 620, or Extended coverage enhancement level 630 for each device group.

After assignment of coverage enhancement levels at operation 812, method 800 proceeds to an operation 814, where a new physical resource block is selected for communication in the WWAN by the NB-IoT devices. Upon selection of the new physical resource block, measurements of updated NRSRP values are obtained for each device group at an operation 816. For example, as described in reference to FIG. 7 above, upon selection of the new physical resource block of the WWAN spectrum (e.g., WWAN 114 shown in FIG. 1) updated measurements of NRSRP values for first device group 501 and second device group 502 are obtained.

Based on these updated NRSRP values obtained at operation 816, method 800 proceeds to an operation 818 where a new assignment (i.e., a second assignment) of coverage enhancement levels is determined for the device groups. For example, as described in reference to FIG. 7, the updated NRSRP values for first device group 501 and second device group 502 are used to dynamically change assignments of coverage enhancement levels.

After operation 818, method 800 may end. Alternatively, method 800 may proceed back to operation 814 to select another new physical resource block and proceed through operations 816 and 818. For example, in the case where the first selection of a new physical resource block at operation 814 results in a worse coverage enhancement level assignment (i.e., changing an assignment from Robust coverage enhancement level 620 to Extended coverage enhancement level 630), a different physical resource block selection may improve the results.

With this mechanism, coverage enhancement levels for groups of NB-IoT devices may be optimized relative to the two NRSRP thresholds for determining assignment of coverage enhancement levels to change the coverage enhancement level distribution of NB-IoT devices within a cell to the minimum required level. Method 800 may be performed to implement this mechanism in steps with a feedback loop to test the results of the change against NB-IoT performance aspects, such as repetitions, loss of communication, etc.

Figure 8B:
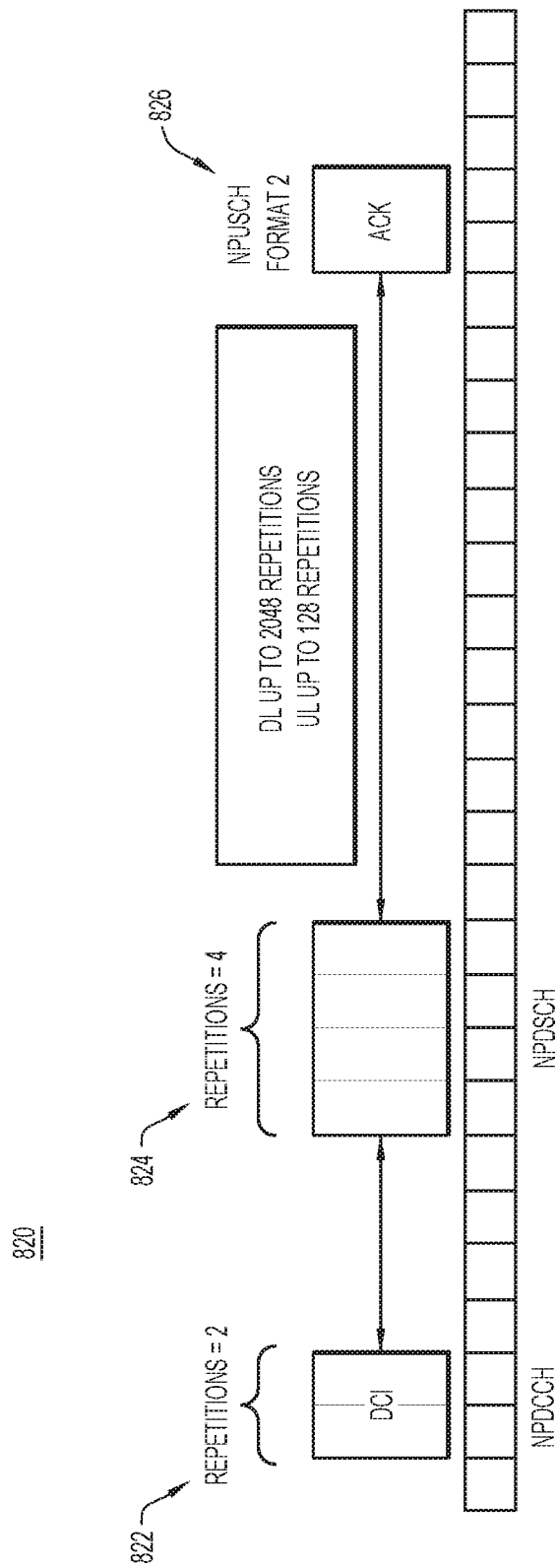
FIG. 8B is a diagram depicting NB-IoT device detection using repetition trend count, according to an example embodiment.

Reference is now made to FIG. 8B, a diagram which shows repetitions used by a NB-IoT device in the Narrowband Physical Downlink Control Channel (NPDCCH), the Narrowband Physical Downlink Shared Channel (NPDSCH) and Narrowband Physical Uplink Shared Channel (NPUSCH). These repetition trend counts can be used to detect NB-IoT devices, according to the techniques described above. For example, as shown at 822, the number of repetitions of downlink control information (DCI) is 2 on the NPDCCH. At 824, the number of repetitions on the NPDSCH is 4, and at 826, the number of repetitions of an ACK in the NPUSCH is 2.

Physical Resource Block Interference Optimization

Figure 9:
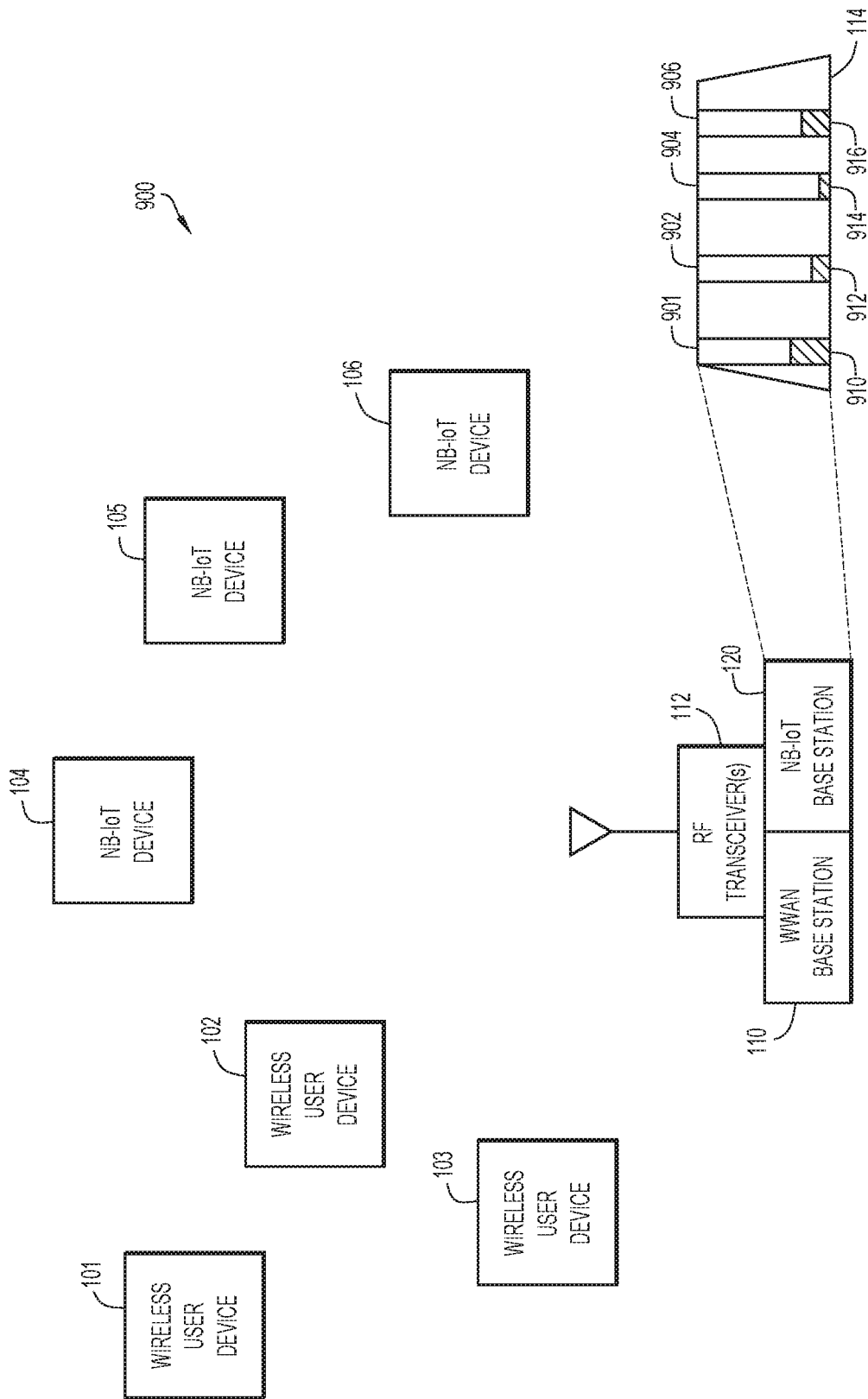
FIG. 9 is a diagram illustrating techniques for physical resource block selection for NB-IoT devices to optimize interference in a wireless wide area network, according to an example embodiment.
Figure 10:
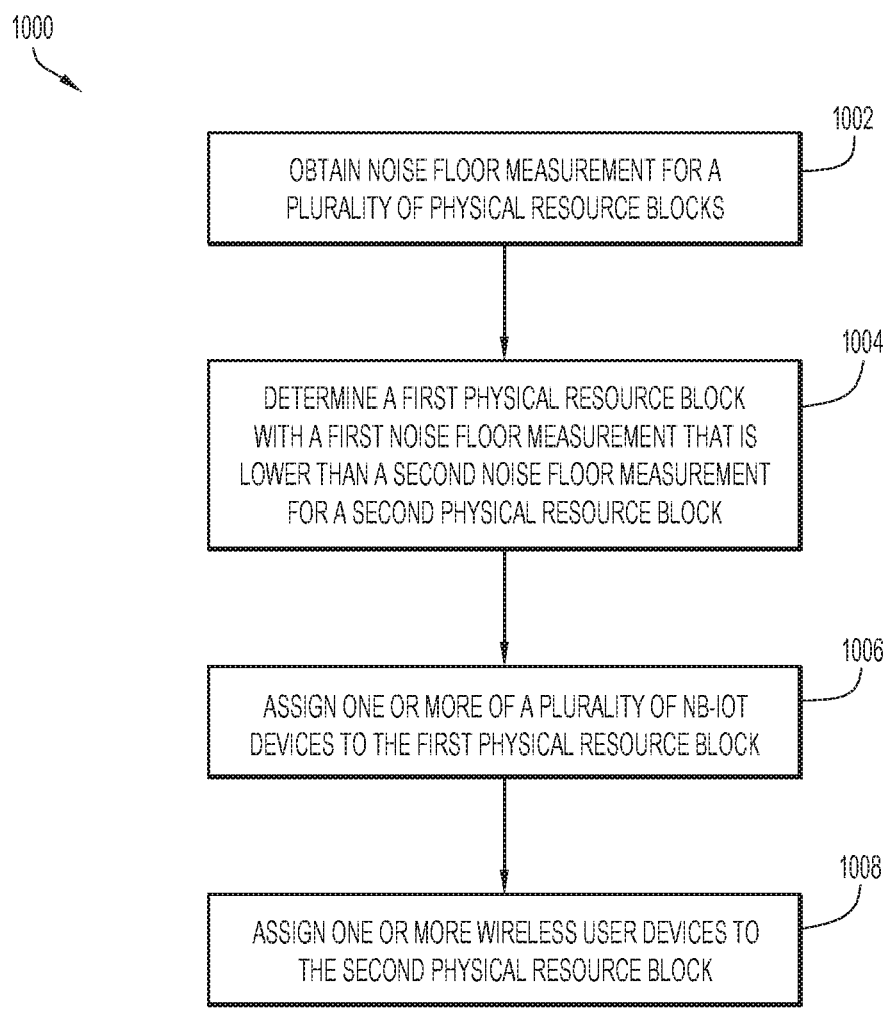
FIG. 10 is a flowchart of a method for selection of a physical resource block in a wireless wide area network for optimizing interference from NB-IoT devices, according to an example embodiment.

Referring now to FIGS. 9-10, techniques for physical resource block optimization of NB-IoT devices configured in an in-band deployment mode in a wireless wide area network for mitigating interference are provided. In a NB-IoT deployment, the capacity of the NB-IoT carrier is shared by all devices and capacity is scalable by adding additional NB-IoT carriers. As described above, in an in-band deployment, the NB-IoT PRB is located within the WWAN band (e.g., PRB 118 in WWAN 114, as shown in FIG. 1).

Selection of a PRB for uplink, as well as downlink, can lead to interference challenges, especially with regard to the NB-IoT uplink causing loss of WWAN uplink throughput. According to the techniques of the example embodiments described herein, avoiding or mitigating interference within selected PRBs uplink and/or downlink may be optimized by selection of PRB.

As shown in FIG. 9, techniques for physical resource block selection for NB-IoT devices to optimize interference in a wireless wide area network may be implemented in an environment 900 according to an example embodiment. In this embodiment, environment 900 includes a plurality of user devices, including one or more wireless user devices (e.g., first wireless user device 101, second wireless user device 102, and third wireless user device 103) and one or more NB-IoT devices (e.g., first NB-IoT device 104, second NB-IoT device 105, and third NB-IoT device 106), as detailed above in reference to FIG. 1. Environment 900 also includes NB-IoT base station 120 anchored to WWAN base station 110 and sharing radio resources, such as RF transceivers 112, with WWAN base station 110, as also detailed above with reference to FIG. 1. It should be understood that environment 900 may include additional user devices, including additional wireless user devices and/or NB-IoT devices.

According to the techniques for physical resource block optimization of NB-IoT devices described herein, a noise floor measurement for each of a plurality of physical resource blocks (PRBs) is used to determine a location of a NB-IoT PRB to mitigate its noise and interference on the parent WWAN band. Such a selection of PRB may be made based on NB-IoT device grouping, as detailed above, and may be made according to a predetermined threshold and/or in accordance with a predefined policy.

In this embodiment, WWAN 114 includes a plurality of PRBs, including a first PRB 901, a second PRB 902, a third PRB 904, and a fourth PRB 906. In the example embodiments, four PRBs are shown for the purposes of explanation, however, it should be understood that a WWAN spectrum may include a larger number of PRBs.

Each PRB may be associated with a noise floor measurement for that PRB. For example, as shown in FIG. 9, first PRB 901 has a first noise floor measurement 910, second PRB 902 has a second noise floor measurement 912, third PRB 904 has a third noise floor measurement 914, and fourth PRB 906 has a fourth noise floor measurement 916.

In this embodiment, fourth noise floor measurement 916 is lower than first noise floor measurement 910, second noise floor measurement 912 is lower than both fourth noise floor measurement 916 and first noise floor measurement 910, and third noise floor measurement 914 is lower than each of second noise floor measurement 912, fourth noise floor measurement 916, and first noise floor measurement 910. As will be further described with reference to FIG. 10, these noise floor measurements for the plurality of PRBs 901, 902, 904, 906 may be used to assign NB-IoT devices and/or wireless user devices to different PRBs such that interference is mitigated and optimized.

Referring now to FIG. 10, a flowchart of a method 1000 for selection of a physical resource block in a wireless wide area network for optimizing interference from NB-IoT devices is shown according to an example embodiment. In some embodiments, method 1000 may be implemented by a NB-IoT base station (e.g., NB-IoT base station 120).

In this embodiment, method 1000 may begin at an operation 1002. At operation 1002, a noise floor measurement for a plurality of physical resource blocks used for communication in a WWAN are obtained. For example, as shown in FIG. 9, NB-IoT base station 120 may obtain noise floor measurements 910, 912, 914, 916 for plurality of physical resource blocks 901, 902, 904, 906 of WWAN 114. Next, at an operation 1004, method 1000 further includes determining a first physical resource block of the plurality of physical resource blocks having a first noise floor measurement that is lower than a second noise floor measurement for a second physical resource block of the plurality of physical resource blocks. For example, referring to FIG. 9, third physical resource block 904 has third noise floor measurement 914 that is lower than first noise floor measurement 910 associated with first physical resource block 901.

At an operation 1006, one or more of a plurality of NB-IoT devices are assigned to the first physical resource block determined at operation 1004. For example, plurality of NB-IoT devices 104, 105, 106 shown in FIG. 9 may be assigned to third physical resource block 904 of WWAN 114 at operation 1006. Next, at an operation 1008, one or more of a plurality of wireless user devices are assigned to the second physical resource block determined at operation 1004. For example, plurality of wireless user devices 101, 102, 103 shown in FIG. 9 may be assigned to first physical resource block 901 of WWAN 114 at operation 1008.

Upon completion of operation 1008, method 1000 may end. In other embodiments, method 1000 may be performed on the basis of one or more groups of NB-IoT devices, which may be grouped based on repetition rates, as described above. In these embodiments, device groups may be assigned to different physical resource blocks based on performance criteria. For example, a first device group of NB-IoT devices may be assigned to second physical resource block 902 having second noise floor measurement 912 and a second device group of NB-IoT devices may be assigned to a different physical resource block having a lower noise floor measurement, for example, third physical resource block 904 having third noise floor measurement 914 that is lower than second noise floor measurement 912.

With this arrangement, method 1000 provides a technique for distributing the location of the physical resource block used by NB-IoT devices to spread the potential interference and mitigate the effects on other wireless devices, such as wireless user devices communicating on the WWAN. The techniques described herein use noise floor measurements associated with physical resource blocks to prioritize assignment between NB-IoT devices and the wireless user devices (e.g., LTE devices). In the example embodiments, the NB-IoT devices are assigned to a physical resource block having a lower noise floor measurement, while traditional wireless user devices are assigned to a physical resource block having a higher noise floor measurement. In other embodiments, a uniform location of the physical resource block per band may be assigned to NB-IoT devices to isolate the interference from NB-IoT devices on the other wireless user devices.

Relative Narrowband Tx Power Information Element for Roaming

Figure 11:
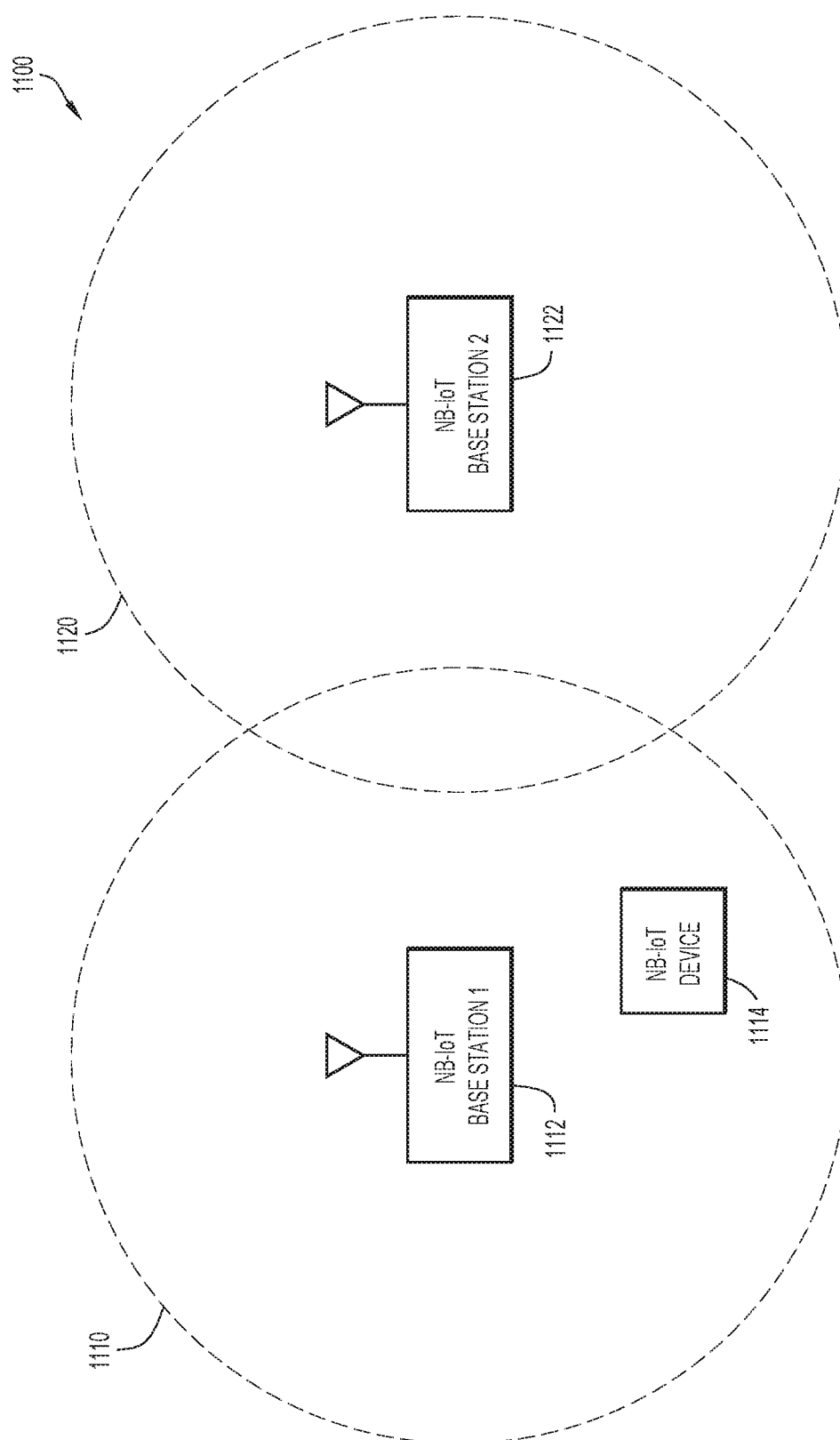
FIG. 11 is a diagram illustrating a roaming scenario for a NB-IoT device traveling between coverage areas of two different NB-IoT base stations, according to an example embodiment.
Figure 12:
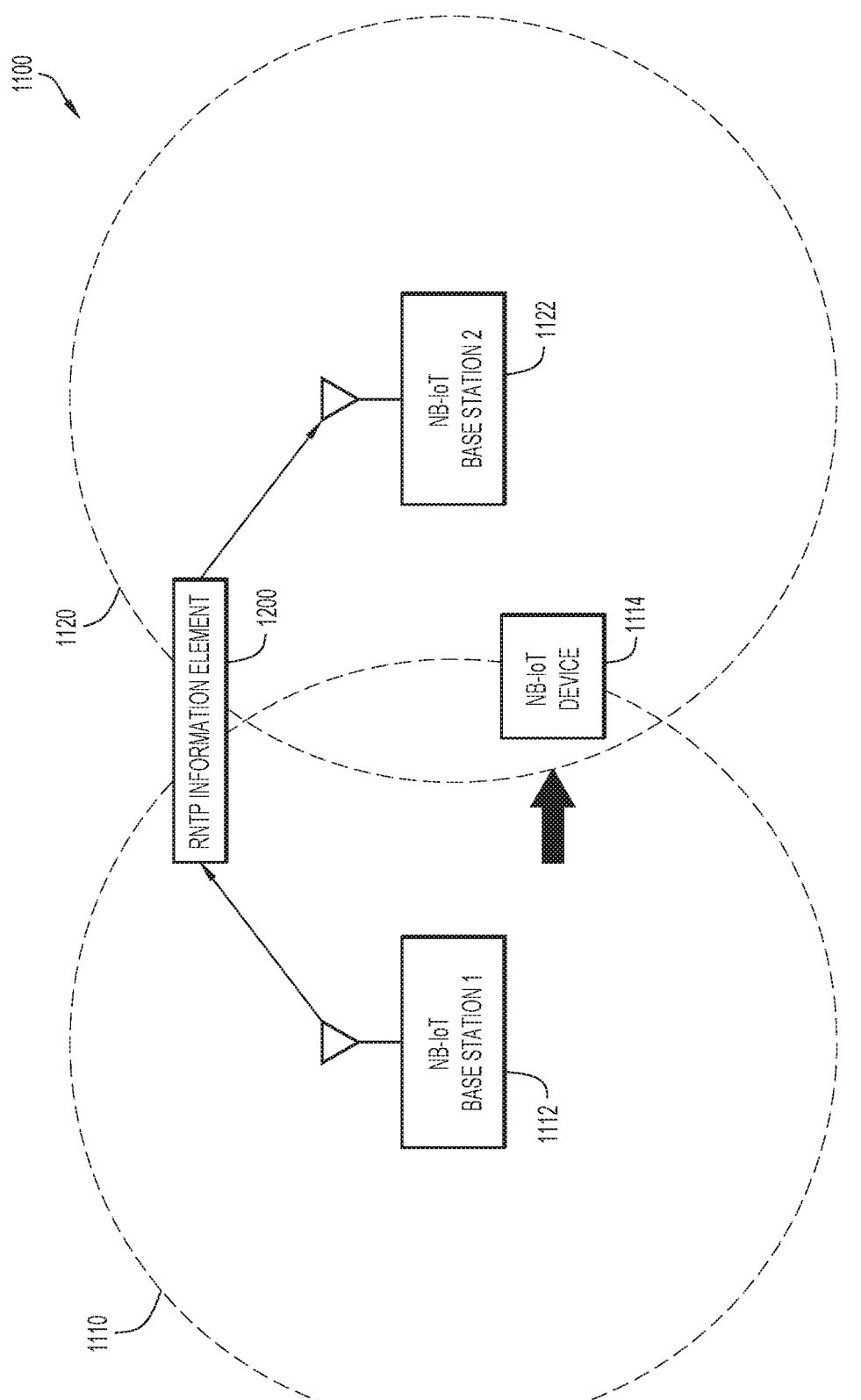
FIG. 12 is a diagram illustrating a roaming NB-IoT device traveling to a new NB-IoT base station, according to an example embodiment.
Figure 13:
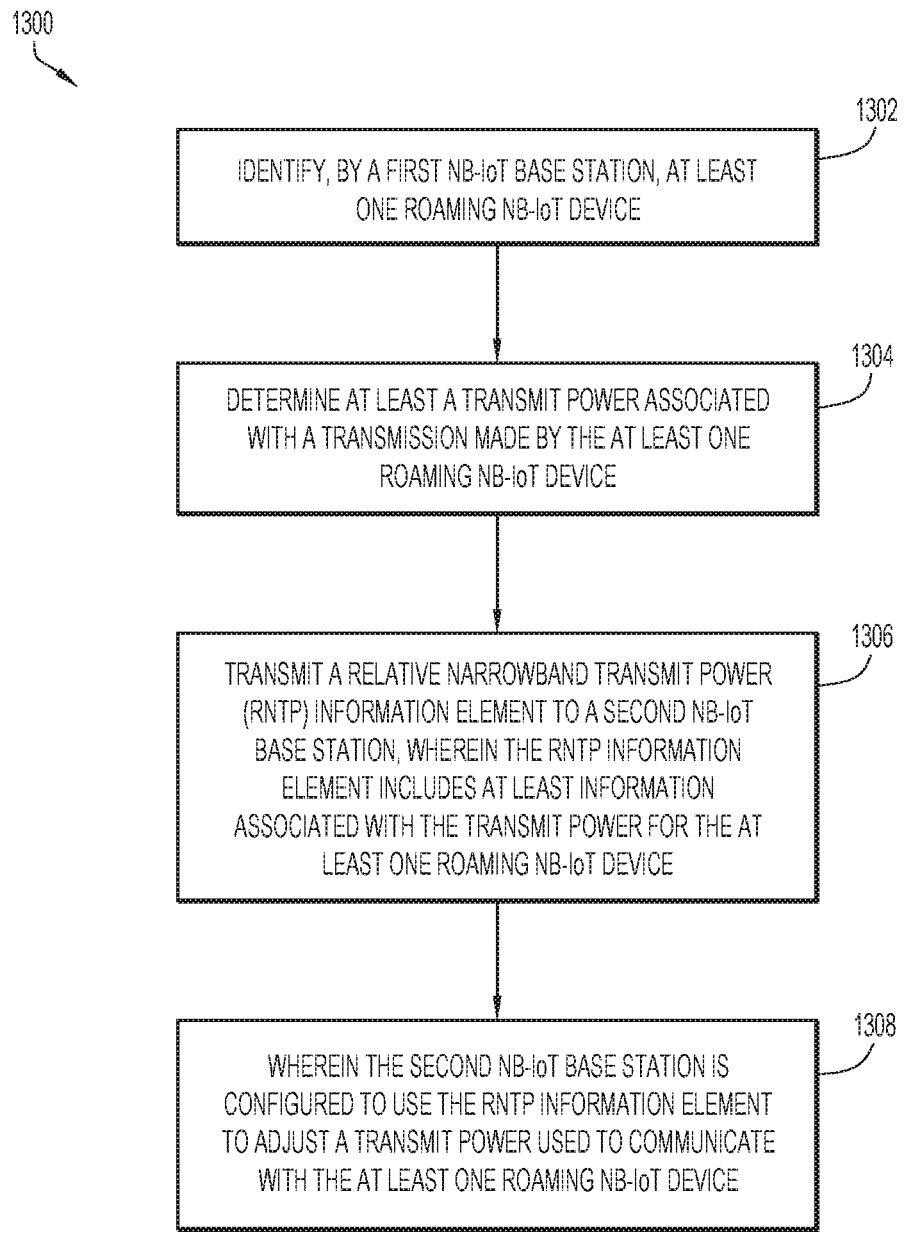
FIG. 13 is a flowchart of a method for using a relative narrowband transmit power information element to optimize power for a roaming NB-IoT device, according to an example embodiment.

Referring now to FIGS. 11-13, techniques for leveraging relative narrowband transmit power (RNTP) information elements to provide for power optimization for a roaming NB-IoT device are provided according to an example embodiment.

FIG. 11 is a diagram illustrating a roaming scenario 1100 for a NB-IoT device 1114 traveling between coverage areas of two different NB-IoT base stations, according to an example embodiment. In this embodiment, roaming scenario 1100 includes a first coverage area 1110 associated with a first NB-IoT base station 1112 and a second coverage area 1120 associated with a second NB-IoT base station 1122. First NB-IoT base station 1112 and second NB-IoT base station 1122 may be substantially similar to NB-IoT base station 120, described above. In this embodiment, roaming NB-IoT device 1114 is currently located within first coverage area 1110, which is being provided by first NB-IoT base station 1112.

In accordance with the 3GPP release 13 specifications, enhanced signaling for inter-eNB coordinated multi-point transmission and reception (CoMP) enhancements provide for usage of RNTP. An RNTP information element (IE) may be exchanged between neighboring eNB base stations that includes an RNTP indicator which provides information about the physical resource block power level information to the neighbor eNB base station to enable interference avoidance in the frequency domain.

According to the techniques of the example embodiments provided herein, RNTP information elements may be leveraged to provide power optimization for a roaming NB-IoT device. Referring now to FIG. 12, a diagram illustrating roaming scenario 1100 for roaming NB-IoT device 1114 traveling to a new NB-IoT base station is shown according to an example embodiment. In this embodiment, roaming NB-IoT device 1114 is traveling from first coverage area 1110 associated with first NB-IoT base station 1112 to second coverage area 1120 associated with second NB-IoT base station 1122. In accordance with the techniques provided herein, first NB-IoT base station 1112 may transmit or provide an RNTP information element 1200 to second NB-IoT base station 1122.

In an example embodiment, RNTP information element 1200 provides, on a per physical resource block basis, information about whether the downlink transmission power is lower than a value indicated by an RNTP threshold included in the RNTP information element 1200. The receiving eNB base station (i.e., second NB-IoT base station 1122) may use this information to set its scheduling policy for power optimization. For example, second NB-IoT base station 1122 may select a physical resource block used for communication in the WWAN for communicating with roaming NB-IoT device 1114 based on the RNTP information included in RNTP information element 1200 transmitted from first NB-IoT base station 1112.

In some embodiments, an RNTP information element (e.g., RNTP information element 1200) may be exchanged between eNB base stations (e.g., first NB-IoT base station 1112 and second NB-IoT base station 1122) over an X2 interface using an X2 application protocol load information message. The receiving eNB base station (i.e., second NB-IoT base station 1122) may consider the received RNTP information value included in RNTP information element valid until reception of a new RNTP information element (e.g., provided in a new load information message) that includes an update from the home eNB base station (i.e., first NB-IoT base station 1112).

In this embodiment, RNTP information element 1200 is used when roaming NB-IoT device 1114 is roaming from one NB-IoT base station to another (e.g., from first NB-IoT base station 1112 to second NB-IoT base station 1122), which results in roaming NB-IoT device 1114 having a different cell identifier value. For example, roaming NB-IoT device 1114 may have a first cell identifier value associated with first NB-IoT base station 1112 while roaming NB-IoT device 1114 is within first coverage area 1110. Upon traveling to second coverage area 1120, roaming NB-IoT device 1114 may be assigned a second cell identifier value associated with second NB-IoT base station 1122, where the second cell identifier value is different than the first cell identifier value.

In an example embodiment, receiving eNB base station (i.e., second NB-IoT base station 1122) may use the RNTP information included in RNTP information element 1200 immediately upon reception to optimize the downlink power to roaming NB-IoT device 1114 on a per physical resource block basis. For example, second NB-IoT base station 1122 may select a physical resource block used for communication in the WWAN for communicating with roaming NB-IoT device 1114 based on the RNTP information included in RNTP information element 1200 from first NB-IoT base station 1112. Additionally, second NB-IoT base station 1122 may use this selected physical resource block to communicate with roaming NB-IoT device 1114 without polling roaming NB-IoT device 1114 to measure its repetition rate.

FIG. 13 is a flowchart of a method 1300 for using a relative narrowband transmit power (RNTP) information element to optimize power for a roaming NB-IoT device, according to an example embodiment. In some embodiments, method 1300 may be implemented by a home NB-IoT base station (e.g., first NB-IoT base station 1112) to transmit an RNTP information element to a receiving NB-IoT base station (e.g., second NB-IoT base station 1122).

In this embodiment, method 1300 may begin at an operation 1302, where a first NB-IoT base station identifies at least one roaming NB-IoT device. For example, first NB-IoT base station 1112 may identify roaming NB-IoT device 1114 in roaming scenario 1100, as shown in FIG. 11, as leaving first coverage area 1110 and entering second coverage area 1120.

Next, method 1300 includes an operation 1304, where the first NB-IoT base station determines at least a transmit power associated with a transmission by the at least one roaming NB-IoT device identified at operation 1302. For example, first NB-IoT base station 1112 may determine a transmit power associated with transmissions made to and/or from roaming NB-IoT device 1114. In some embodiments, operation 1304 may include determining other information associated with the roaming NB-IoT device, including, for example, identifier information.

Method 1300 may proceed to an operation 1306, where the first NB-IoT base station transmits an RNTP information element to a second NB-IoT base station. The RNTP information element transmitted or provided by the first NB-IoT base to the second NB-IoT base station includes at least information associated with the transmit power for the at least one roaming NB-IoT device, obtained or determined at operation 1304. For example, as shown in FIG. 12, first NB-IoT base station 1112 may transmit or provide RNTP information element 1200 associated with roaming NB-IoT device 1114 to second NB-IoT base station 1122.

Upon transmitting the RNTP information element from the first NB-IoT base station, method 1300 includes an operation 1308. At operation 1308, the receiving NB-IoT base station is configured to use the RNTP information element provided from operation 1306 to adjust a transmit power used to communicate with the at least one roaming NB-IoT device. For example, second NB-IoT base station 1122 may use information associated with a transmit power included in RNTP information element 1200 to adjust a transmit power used to communicate with roaming NB-IoT device 1114. That is, upon traveling from first coverage area 1110 to second coverage area 1120, the transmit power for roaming NB-IoT device 1114 may be immediately adjusted by second NB-IoT base station 1122 based on the information included in RNTP information element 1200. With this configuration, second NB-IoT base station 1122 is configured to use a selected physical resource block (i.e., based on information in RNTP information element 1200) to communicate with roaming NB-IoT device 1114 without polling roaming NB-IoT device 1114 to measure its repetition rate.

After operation 1308, method 1300 may end. Additionally, in some embodiments, method 1300 may be implemented for a plurality of roaming NB-IoT devices. In such embodiments, method 1300 may include similar operations as described above for the plurality of roaming NB-IoT devices, including sending a plurality of RNTP information elements to the receiving NB-IoT base station (e.g., second NB-IoT base station 1122). In other embodiments, a plurality of roaming NB-IoT devices may roam into coverage areas associated with a plurality of different NB-IoT base stations. In these other such embodiments, the home NB-IoT base station (e.g., first NB-IoT base station 1112) may send RNTP information elements to each receiving NB-IoT base station for the coverage areas where the roaming NB-IoT devices are traveling.

The techniques for leveraging RNTP information elements to provide for power optimization for a roaming NB-IoT device provided herein results in mitigating asymmetric power setting problems between a roamed NB-IoT device and a new eNB (e.g., NB-IoT base station). Such asymmetric power setting problems can cause packet drops over the air in the downlink direction when an eNB with a higher transmit power is sending data packets to a roaming NB-IoT device which has a lower power level. The example embodiments described above also reduces the need to poll 2048 physical resource block repetitions from the eNB to identify a suitable physical resource block to allocate for the roaming NB-IoT device.

The example embodiments provide several benefits for SON-based radio resource management for NB-IoT in-band deployments. For example, using the techniques described herein, a NB-IoT device need not wait for another discontinuous reception (DRX) cycle. To extend a UE's battery lifetime, an RRC connected UE may be configured with a DRX cycle. A DRX cycle consists of an 'On Duration' during which the UE should monitor the PDCCH and a 'DRX period' during which a UE can skip reception of downlink channels for battery saving purposes. The transition between the short DRX cycle, the long DRX cycle and continuous reception is controlled either by a timer or by explicit commands from the base station.

Conventional physical resource block based scanning for multiple iterations until 2048 repetitions can take a significant amount of time, thereby contributing to an increase in airtime utilization for scanning control and management packets. This additional scanning latency is avoided with the techniques of the example embodiments, which may be especially useful in roaming scenarios.

Figure 14:
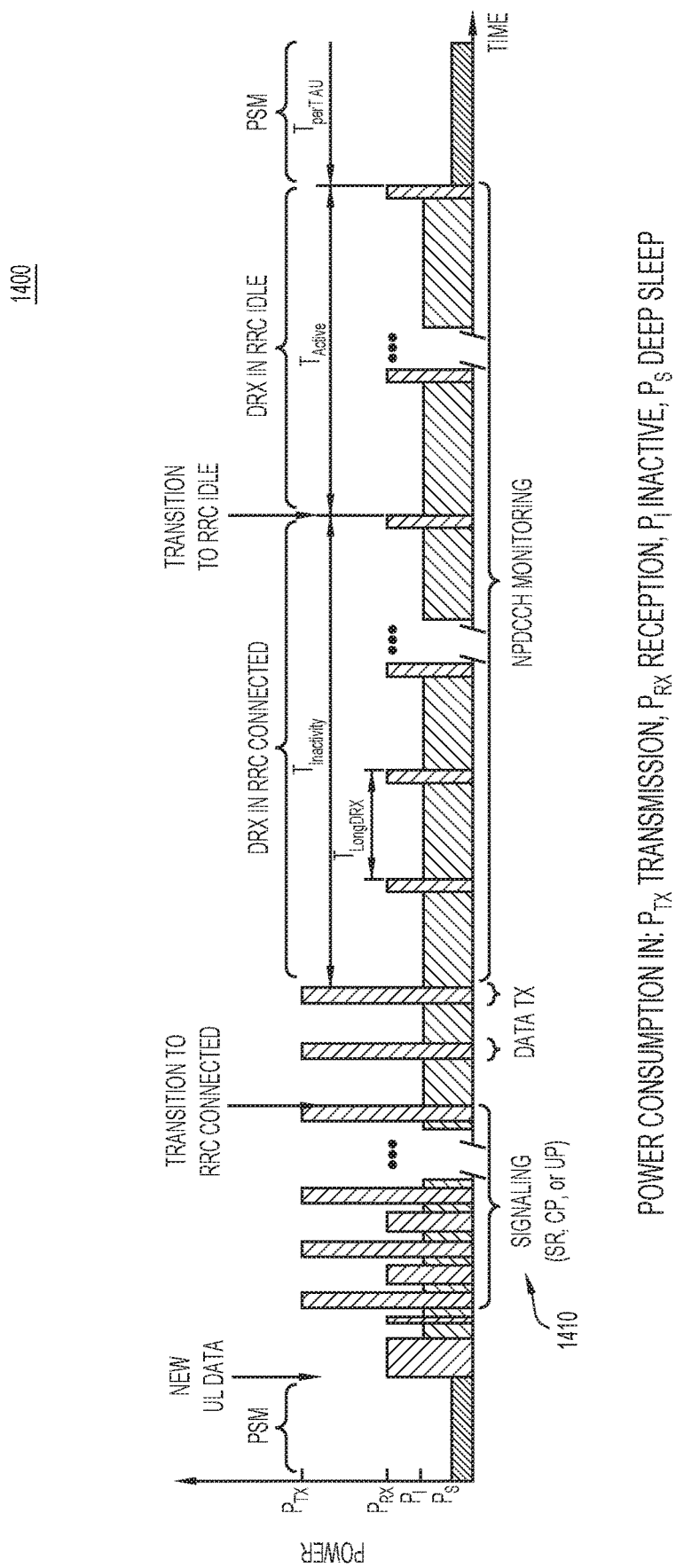
FIG. 14 is a diagram is a diagram showing a power consumption transition pattern during a connection phase of a NB-IoT device, according to an example embodiment.

Reference is now made to FIG. 14. FIG. 14 shows a power consumption transition pattern 1400 during a NB-IoT device's connection phase. $P_{TX}$ is the power consumption during a transmission, $P_{RX}$ is a power consumption during a reception, $P_I$ is power consumption with inactive and $P_S$ is power consumption when in deep sleep. For a NB-IoT device, an extended DRX cycle of 10.24 sec is supported in RRC connected state. In RRC idle state, the maximum DRX cycle is 2.91 hours. For the Power Saving Mode (PSM) state, the maximum PSM time is 310 hours. The extension of both mechanisms implies a higher latency because the network will wait a longer period of time until it is able to reach the user device. However, this reduces power consumption of the user device. According to the techniques presented herein, and as shown at 1410, the RNTP IE is used for a roaming NB-IoT device and as a result the NB-IoT device need not wait for an additional DRX cycle to assign the correct power level in the downlink direction to the NB-IoT device.

Additionally, the principles of the example embodiments described herein can provide a roaming NB-IoT device with optimized transmit power towards its direction of travel immediately after entering a new coverage area. This can result in a better user experience and mission critical payloads can be delivered to a NB-IoT device earlier without undergoing any asymmetric power setting problems resulting in packet drops over the air.

Techniques described herein for NB-IoT device grouping and wireless user device grouping (e.g., LTE devices) based on radio resource allocation provides efficient utilization of WWAN airtime in both the uplink and downlink directions.

Furthermore, the techniques for NB-IoT device grouping and wireless user device grouping also allow for flexibility in applying radio policies from the same eNB, which may handle both wireless user devices (e.g., LTE devices) and NB-IoT devices, to handle the traffic more effectively. This radio policy can be applied for different kinds of NB-IoT devices. For example, NB-IoT sensors used in smart parking systems that may be deployed in basements of buildings where radio coverage is poor need robust NRSRP allocations, whereas NB-IoT devices deployed in a smart city or enterprise environment will be sufficient with normal coverage levels.

In summary, a method is provided comprising: providing a narrowband Internet-of-Things (NB-IoT) base station in an in-band deployment mode to operate within a wide area wireless network (WWAN), wherein the NB-IoT base station is configured to use a physical resource block of the WWAN for communicating with a plurality of NB-IoT devices; causing, by the NB-IoT base station, a reduction of a power level for a transmission using the physical resource block from an initial power level to a first reduced power level; obtaining, by the NB-IoT base station, parameters associated with performance and throughput for the WWAN; comparing, by the NB-IoT base station, the parameters to a quality threshold; and based on the comparison of the parameters to the threshold, determining, by the NB-IoT base station, whether or not to reduce the power level for the physical resource block from the first reduced power level to a second reduced power level.

In another form, a non-transitory computer readable storage media encoded with instructions is provided that, when executed by a processor of a narrowband Internet-of-Things (NB-IoT) base station operating in an in-band deployment mode within a wide area wireless network (WWAN), causes the processor to: reduce a power level for a physical resource block of the WWAN used for communicating with a plurality of NB-IoT devices from an initial power level to a first reduced power level; obtain parameters associated with performance and throughput for the WWAN; compare the parameters to a quality threshold; and based on the comparison of the parameters to the threshold, determine whether or not to reduce the power level for the physical resource block from the first reduced power level to a second reduced power level.

Furthermore, an apparatus is provided comprising: a transceiver configured to transmit and receive signals in a wireless wide area network (WWAN); a modem coupled to the transceiver and configured to modulate signals and demodulate signals; a processor coupled to the modem and to the transceiver, wherein the processor is configured to: reduce a power level for a physical resource block of the WWAN used for communicating with a plurality of NB-IoT devices from an initial power level to a first reduced power level; obtain parameters associated with performance and throughput for the WWAN; compare the parameters to a quality threshold; and based on the comparison of the parameters to the threshold, determine whether or not to reduce the power level for the physical resource block from the first reduced power level to a second reduced power level.

In another embodiment, a method is provided comprising: monitoring, by a narrowband Internet-of-Things (NB-IoT) base station in an in-band deployment mode operating within a wide area wireless network (WWAN), a repetition rate of transmissions made by a plurality of NB-IoT devices; assigning one or more of the plurality of NB-IoT devices associated with a first repetition rate to a first device group; assigning one or more of the plurality of NB-IoT devices associated with a second repetition rate to a second device group, wherein the second repetition rate is different than the first repetition rate; upon selection of an initial physical resource block used for communication in the WWAN, obtaining measurements of narrowband reference signal received power values for the first device group and the second device group; based on the narrowband reference signal received power values, determining a first assignment of coverage enhancement levels for each of the first device group and the second device group; selecting a new physical resource block; obtaining measurements of updated narrowband reference signal received power values for the first device group and the second device group associated with the new physical resource block; and based on the updated narrowband reference signal received power values, determining a second assignment of coverage enhancement levels for each of the first device group and the second device group.

In some embodiments, determining the first assignment of coverage enhancement levels includes assigning the first device group to a first enhancement level and assigning the second device group to a second enhancement level, wherein the second enhancement level is different than the first enhancement level.

In some embodiments, determining the second assignment of coverage enhancement levels includes assigning the first device group to the first enhancement level and assigning the second device group to the first enhancement level.

In some embodiments, the coverage enhancement levels comprise: a normal enhancement level associated with a maximum coupling loss of 144 dB, a robust enhancement level associated with a maximum coupling loss of 154 dB, and an extended enhancement level associated with a maximum coupling loss of 164 dB.

In some embodiments, each coverage enhancement level is associated with a set of Narrowband Physical Random Access Channel (NPRACH) resources for that coverage enhancement level.

In some embodiments, the set of NPRACH resources includes a subset of subcarriers, a number of NPRACH repetitions, and a maximum number of attempts a NB-IoT device may make.

In another embodiment, a non-transitory computer readable storage media encoded with instructions is provided that, when executed by a processor of a narrowband Internet-of-Things (NB-IoT) base station operating in an in-band deployment mode within a wide area wireless network (WWAN), causes the processor to: monitor a repetition rate of transmissions made by a plurality of NB-IoT devices; assign one or more of the plurality of NB-IoT devices associated with a first repetition rate to a first device group; assign one or more of the plurality of NB-IoT devices associated with a second repetition rate to a second device group, wherein the second repetition rate is different than the first repetition rate; upon selection of an initial physical resource block used for communication in the WWAN, obtain measurements of narrowband reference signal received power values for the first device group and the second device group; based on the narrowband reference signal received power values, determine a first assignment of coverage enhancement levels for each of the first device group and the second device group; select a new physical resource block; obtain measurements of updated narrowband reference signal received power values for the first device group and the second device group associated with the new physical resource block; and based on the updated narrowband reference signal received power values, determine a second assignment of coverage enhancement levels for each of the first device group and the second device group.

Furthermore, in another embodiment, an apparatus is provided comprising: a transceiver configured to transmit and receive signals in a wireless wide area network (WWAN); a modem coupled to the transceiver and configured to modulate signals and demodulate signals; a processor coupled to the modem and to the transceiver, wherein the processor is configured to: monitor a repetition rate of transmissions made by a plurality of NB-IoT devices; assign one or more of the plurality of NB-IoT devices associated with a first repetition rate to a first device group; assign one or more of the plurality of NB-IoT devices associated with a second repetition rate to a second device group, wherein the second repetition rate is different than the first repetition rate; upon selection of an initial physical resource block used for communication in the WWAN, obtain measurements of narrowband reference signal received power values for the first device group and the second device group; based on the narrowband reference signal received power values, determine a first assignment of coverage enhancement levels for each of the first device group and the second device group; select a new physical resource block; obtain measurements of updated narrowband reference signal received power values for the first device group and the second device group associated with the new physical resource block; and based on the updated narrowband reference signal received power values, determine a second assignment of coverage enhancement levels for each of the first device group and the second device group.

In another embodiment, a method is provided comprising: obtaining by a narrowband Internet-of-Things (NB-IoT) base station in an in-band deployment mode operating within a wide area wireless network (WWAN), a noise floor measurement for a plurality of physical resource blocks used for communication in the WWAN; determining a first physical resource block of the plurality of physical resource blocks having a first noise floor measurement that is lower than a second noise floor measurement for a second physical resource block of the plurality of physical resource blocks; assigning one or more of a plurality of NB-IoT devices to the first physical resource block; and assigning one or more wireless user devices to the second physical resource block.

In some embodiments, the method further comprises: identifying, by the NB-IoT base station, the plurality of NB-IoT devices based on at least a detected repetition rate on a physical random access channel of a transmission made by a device of the plurality of NB-IoT devices.

In some embodiments, identifying the plurality of NB-IoT devices includes monitoring Signal-Information Blocks in the transmission made by a device of the plurality of NB-IoT devices.

In some embodiments, the method further comprises: grouping one or more of the plurality of NB-IoT devices associated with a first repetition rate to a first device group; grouping one or more of the plurality of NB-IoT devices associated with a second repetition rate to a second device group, wherein the second repetition rate is different than the first repetition rate; assigning at least one of the first device group or the second device group to the first physical resource block.

In some embodiments, the first device group is assigned to the first physical resource block, the method further comprises: assigning the second device group to a third physical resource block, wherein the third physical resource block has a third noise floor measurement that is lower than the second noise floor measurement for the second physical resource block.

In some embodiments, the first physical resource block and the second physical resource block are selected based on minimizing interference between the plurality of NB-IoT devices and the one or more wireless user devices.

In another embodiment, a non-transitory computer readable storage media encoded with instructions is provided that, when executed by a processor of a narrowband Internet-of-Things (NB-IoT) base station operating in an in-band deployment mode within a wide area wireless network (WWAN), causes the processor to: obtain a noise floor measurement for a plurality of physical resource blocks used for communication in the WWAN; determine a first physical resource block of the plurality of physical resource blocks having a first noise floor measurement that is lower than a second noise floor measurement for a second physical resource block of the plurality of physical resource blocks; assign one or more of a plurality of NB-IoT devices to the first physical resource block; and assign one or more wireless user devices to the second physical resource block.

Furthermore, in another embodiment, an apparatus is provided comprising: a transceiver configured to transmit and receive signals in a wireless wide area network (WWAN); a modem coupled to the transceiver and configured to modulate signals and demodulate signals; a processor coupled to the modem and to the transceiver, wherein the processor is configured to: obtain a noise floor measurement for a plurality of physical resource blocks used for communication in the WWAN; determine a first physical resource block of the plurality of physical resource blocks having a first noise floor measurement that is lower than a second noise floor measurement for a second physical resource block of the plurality of physical resource blocks; assign one or more of a plurality of NB-IoT devices to the first physical resource block; and assign one or more wireless user devices to the second physical resource block.

In another embodiment, a method is provided comprising: identifying, by a first narrowband Internet-of-Things (NB-IoT) base station in an in-band deployment mode operating within a wide area wireless network (WWAN), at least one roaming NB-IoT device; determining, by the first NB-IoT base station, at least a transmit power associated with a transmission made by the at least one roaming NB-IoT device; transmitting, by the first NB-IoT base station, a relative narrowband transmit power (RNTP) information element to a second NB-IoT base station, wherein the RNTP information element includes at least information associated with the transmit power for the at least one roaming NB-IoT device; and wherein the second NB-IoT base station is configured to use the RNTP information element from the first NB-IoT base station to adjust a transmit power of the second NB-IoT base station used to communicate with the at least one roaming NB-IoT device.

In some embodiments, the method further comprises: providing the RNTP information element to the second NB-IoT base station via an X2 interface using an X2 application protocol load information message.

In some embodiments, the second NB-IoT base station is configured to select a physical resource block used for communication in the WWAN for communicating with the at least one roaming NB-IoT device based on the RNTP information from the first NB-IoT base station.

In some embodiments, the second NB-IoT base station is configured to use the selected physical resource block to communicate with the at least one roaming NB-IoT device without polling the at least one roaming NB-IoT device to measure a repetition rate of the at least one roaming NB-IoT device.

In some embodiments, the at least one roaming NB-IoT device has a first cell identifier value associated with the first NB-IoT base station; and wherein the at least one roaming NB-IoT device is assigned a second cell identifier value associated with the second NB-IoT base station, wherein the second cell identifier value is different than the first cell identifier value.

In some embodiments, the method further comprises: transmitting, by the first NB-IoT base station, a plurality of RNTP information elements to the second NB-IoT base station for a plurality of roaming NB-IoT devices In another embodiment, a non-transitory computer readable storage media encoded with instructions is provided that, when executed by a processor of a first narrowband Internet-of-Things (NB-IoT) base station operating in an in-band deployment mode within a wide area wireless network (WWAN), causes the processor to: identify at least one roaming NB-IoT device; determine at least a transmit power associated with a transmission made by the at least one roaming NB-IoT device; transmit a relative narrowband transmit power (RNTP) information element to a second NB-IoT base station, wherein the RNTP information element includes at least information associated with the transmit power for the at least one roaming NB-IoT device; and wherein the second NB-IoT base station is configured to use the RNTP information element from the first NB-IoT base station to adjust a transmit power of the second NB-IoT base station used to communicate with the at least one roaming NB-IoT device.

Furthermore, in another embodiment, an apparatus is provided comprising: a transceiver configured to transmit and receive signals in a wireless wide area network (WWAN); a modem coupled to the transceiver and configured to modulate signals and demodulate signals; a processor coupled to the modem and to the transceiver, wherein the processor is configured to: identify at least one roaming NB-IoT device; determine at least a transmit power associated with a transmission made by the at least one roaming NB-IoT device; transmit a relative narrowband transmit power (RNTP) information element to a NB-IoT base station, wherein the RNTP information element includes at least information associated with the transmit power for the at least one roaming NB-IoT device; and wherein the NB-IoT base station is configured to use the RNTP information element from the apparatus to adjust a transmit power of the NB-IoT base station used to communicate with the at least one roaming NB-IoT device.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
providing a narrowband Internet-of-Things (NB-IoT) base station in an in-band deployment mode to operate within a wide area wireless network (WWAN), wherein the NB-IoT base station is configured to use a physical resource block of the WWAN for communicating with a plurality of NB-IoT devices, wherein the plurality of NB-IoT devices are identified based on at least a detected repetition rate on a physical random access channel of a transmission made by a device of the plurality of NB-IoT devices, and wherein the plurality of NB-IoT devices are grouped to the physical resource block of the WWAN;
causing, by the NB-IoT base station, a reduction of a power level of the NB-IoT base station for a transmission using the physical resource block from an initial power level to a first reduced power level;
obtaining, by the NB-IoT base station, parameters associated with performance and throughput for the WWAN and for the NB-IoT base station;
comparing, by the NB-IoT base station, the parameters to a quality threshold; and
based on the comparing of the parameters to the quality threshold, determining, by the NB-IoT base station, whether or not to reduce the power level for the physical resource block from the first reduced power level to a second reduced power level.

2. The method of claim 1, wherein causing the reduction of the power level for the physical resource block is performed in one or more step decreases of a predetermined amount.

3. The method of claim 1, further comprising:
upon determining to reduce the power level from the first reduced power level to the second reduced power level, obtaining, by the NB-IoT base station, updated parameters associated with performance and throughput for the WWAN based on the second reduced power level; and
comparing, by the NB-IoT base station, the updated parameters to the quality threshold.

4. The method of claim 1, wherein upon determining that the parameters are below the quality threshold, changing, by the NB-IoT base station, the power level for the physical resource block from the first reduced power level back to the initial power level.

5. The method of claim 1, wherein identifying the plurality of NB-IoT devices includes monitoring Signal-Information Blocks in the transmission made by an NB-IoT device of the plurality of NB-IoT devices.

6. The method of claim 1, wherein the NB-IoT base station shares resources with a base station for the WWAN.

7. One or more non-transitory computer readable storage media encoded with instructions that, when executed by a processor of a narrowband Internet-of-Things (NB-IoT) base station operating in an in-band deployment mode within a wide area wireless network (WWAN), cause the processor to:

reduce a power level of the NB-IoT base station for a physical resource block of the WWAN used for communicating with a plurality of NB-IoT devices from an initial power level to a first reduced power level, wherein the plurality of NB-IoT devices are identified based on at least a detected repetition rate on a physical random access channel of a transmission made by a device of the plurality of NB-IoT devices, and wherein the plurality of NB-IoT devices are grouped to the physical resource block of the WWAN;
obtain parameters associated with performance and throughput for the WWAN and for the NB-IoT base station;
compare the parameters to a quality threshold; and
based on the compare of the parameters to the quality threshold, determine whether or not to reduce the power level for the physical resource block from the first reduced power level to a second reduced power level.

8. The one or more non-transitory computer readable storage media of claim 7, wherein reducing the power level for the physical resource block is performed in one or more step decreases of a predetermined amount.

9. The one or more non-transitory computer readable storage media of claim 7, wherein the instructions further cause the processor to:
upon determining to reduce the power level from the first reduced power level to the second reduced power level, obtain updated parameters associated with performance and throughput for the WWAN based on the second reduced power level; and
compare the updated parameters to the quality threshold.

10. The one or more non-transitory computer readable storage media of claim 7, wherein the instructions further cause the processor to:
upon determining that the parameters are below the quality threshold, change the power level for the physical resource block from the first reduced power level back to the initial power level.

11. The one or more non-transitory computer readable storage media of claim 7, wherein identifying the plurality of NB-IoT devices includes monitoring Signal-Information Blocks in the transmission made by an NB-IoT device of the plurality of NB-IoT devices.

12. The one or more non-transitory computer readable storage media of claim 7, wherein the NB-IoT base station shares resources with a base station for the WWAN.

13. An apparatus comprising:
a transceiver configured to transmit and receive signals in a wireless wide area network (WWAN);
a modem coupled to the transceiver and configured to modulate signals and demodulate signals;
a processor coupled to the modem and to the transceiver, wherein the processor is configured to:
reduce a power level of the transceiver for a physical resource block of the WWAN used for communicating with a plurality of NB-IoT devices from an initial power level to a first reduced power level, wherein the plurality of NB-IoT devices are identified based on at least a detected repetition rate on a physical random access channel of a transmission made by a device of the plurality of NB-IoT devices, and wherein the plurality of NB-IoT devices are grouped to the physical resource block of the WWAN;
obtain parameters associated with performance and throughput for the WWAN and for the apparatus;
compare the parameters to a quality threshold; and based on the compare of the parameters to the quality threshold, determine whether or not to reduce the power level for the physical resource block from the first reduced power level to a second reduced power level.

14. The apparatus of claim 13, wherein reducing the power level for the physical resource block is performed in one or more step decreases of a predetermined amount.

15. The apparatus of claim 13, wherein the processor is further configured to:
   upon determining to reduce the power level from the first reduced power level to the second reduced power level, obtain updated parameters associated with performance and throughput for the WWAN based on the second reduced power level; and
   compare the updated parameters to the quality threshold.

16. The apparatus of claim 13, wherein the processor is further configured to:
   upon determining that the parameters are below the quality threshold, change the power level for the physical resource block from the first reduced power level back to the initial power level.

17. The apparatus of claim 13, wherein the apparatus shares resources with a base station for the WWAN.

18. The apparatus of claim 13, wherein identifying the plurality of NB-IoT devices includes monitoring Signal-Information Blocks in the transmission made by an NB-IoT device of the plurality of NB-IoT devices.

* * * * *